US006934603B1

(12) United States Patent
Kochanneck

(10) Patent No.: US 6,934,603 B1
(45) Date of Patent: Aug. 23, 2005

(54) MULTIBLOCK ROBOT SYSTEM

(76) Inventor: Uwe Kochanneck, Im Telgei 11, D-59174 Kamen (DE)

( * ) Notice: Subject to any disclaimer, the term of this patent is extended or adjusted under 35 U.S.C. 154(b) by 0 days.

(21) Appl. No.: 09/298,204

(22) Filed: Apr. 23, 1999

(30) Foreign Application Priority Data

May 6, 1998 (DE) .......................................... 198 20 110

(51) Int. Cl.$^7$ .............................................. G06F 19/00
(52) U.S. Cl. .......................... 700/245; 700/93; 700/248; 700/258; 700/275; 700/302; 701/23; 701/24; 701/111; 701/120; 370/390; 370/352; 370/389; 370/392; 370/496; 370/522; 455/414; 455/466; 455/404; 455/419; 455/445; 342/23; 342/33; 342/36; 342/54; 318/587
(58) Field of Search .......................... 700/245, 93, 302, 700/258, 248, 275; 701/24, 23, 111, 120; 370/390, 352, 389, 392, 496, 522; 455/414, 466, 404, 419, 445, 560; 705/6, 412; 342/23, 33, 36, 54; 318/587

(56) References Cited

U.S. PATENT DOCUMENTS

| 4,232,988 | A | * | 11/1980 | Kochanneck | .......... | 414/331.02 |
|---|---|---|---|---|---|---|
| 4,252,488 | A | * | 2/1981 | Kochanneck | .......... | 414/331.03 |
| 5,241,875 | A | * | 9/1993 | Kochanneck | ............ | 74/490.03 |
| 5,850,762 | A | * | 12/1998 | Kochanneck | .......... | 318/490.03 |
| 5,852,353 | A | * | 12/1998 | Kochanneck | ................ | 318/558 |
| 6,014,597 | A | * | 1/2000 | Kochanneck | ................ | 701/22 |

OTHER PUBLICATIONS

Parent et al., Automated Urban Vehicles: ‚Towards A Dual Mode PRT (Personal Rapid Transit), IEEE., pp. 3129–3134, 1996.*
Behringer et al., Road And Relative Ego–State Recognition, IEEE., pp. 385–390, 1990.*

* cited by examiner

Primary Examiner—William A. Cuchlinski, Jr.
Assistant Examiner—McDieunel Marc

(57) ABSTRACT

The advantage of flexible multi-axis robot systems and robot cell-unit systems being further extended by providing electric and electronic E-POOL networks, consisting of multi-block individual computer units, central computers, board computers, satellite units, antenna units, open and contact protected under floor and upper floor current and communication supply lines. The electric and electronic E-POOL networks being far-reaching energy independent and having continuous data exchange to all E-POOL network members, composing a self operating E-POOL compound E-POOL users, equipped with E-POOL computer units and to these compatible E-POOL order software, are transmitting orders and instructions to the E-POOL central computers for deliveries and services, which are immediately, self operating produced from the E-POOL compound, composed, distributed and transported to the aimed destination and the precise position of a company ground, an institutional building, a house floor, to a private apartment, and to any other predetermined destination.

9 Claims, 20 Drawing Sheets

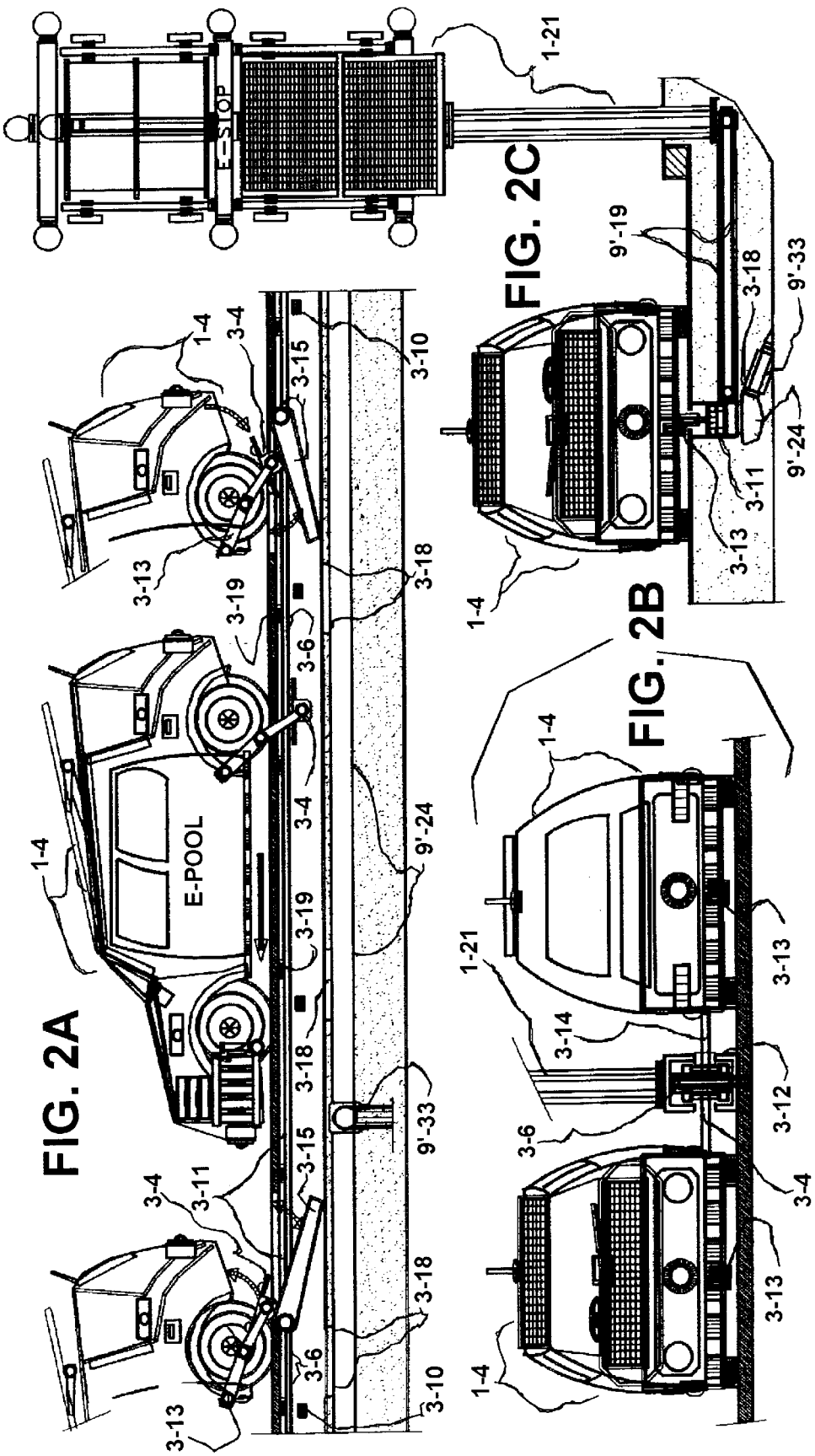

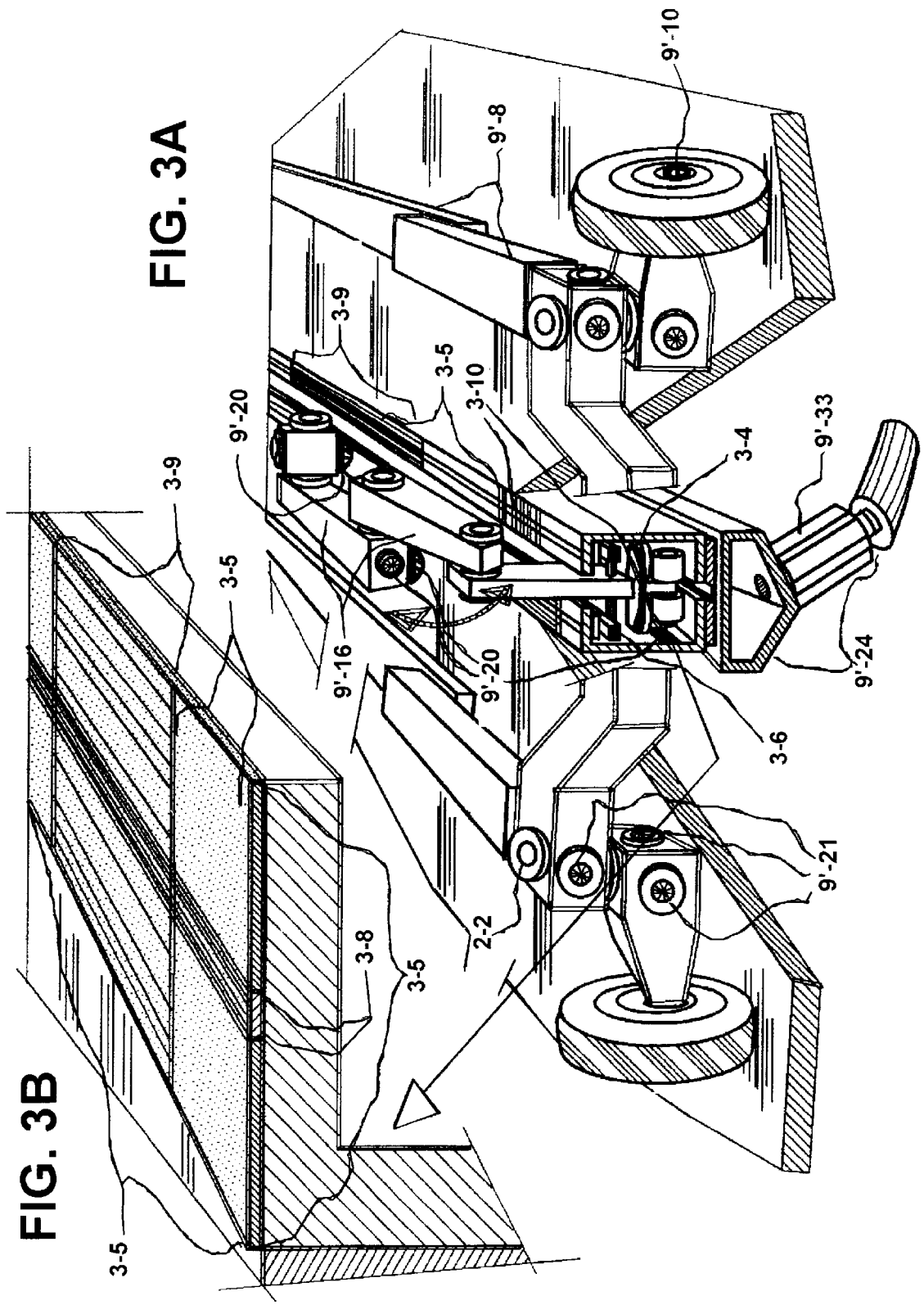

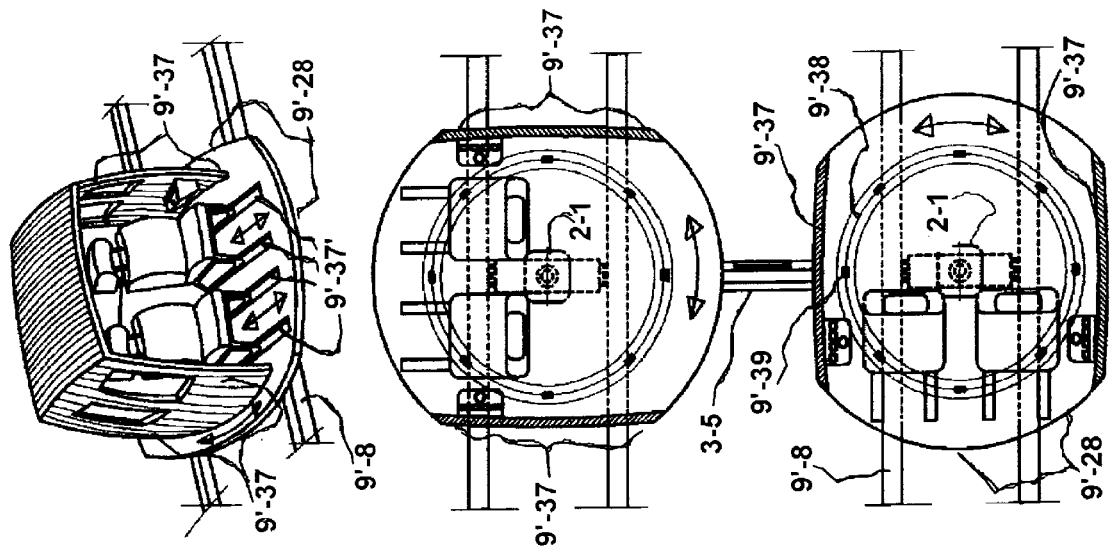
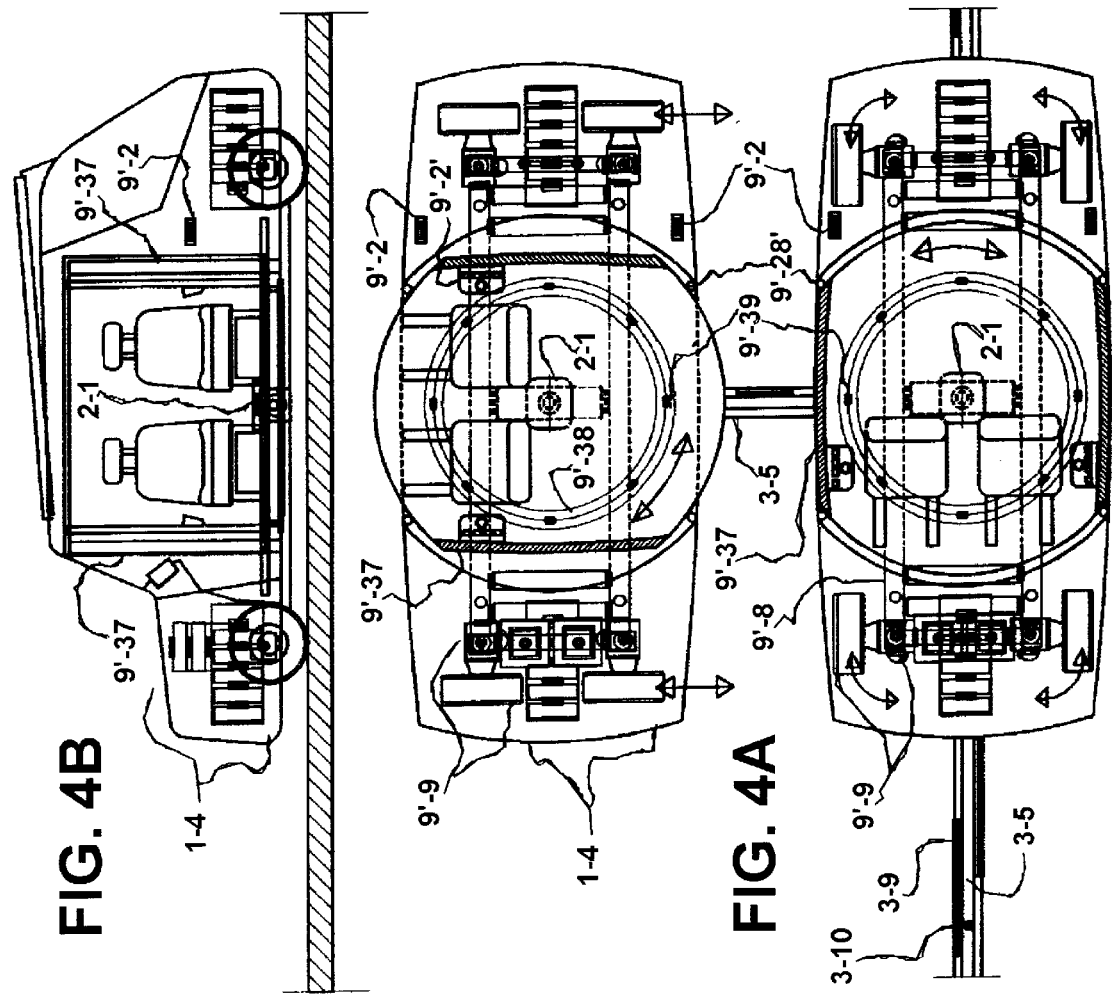

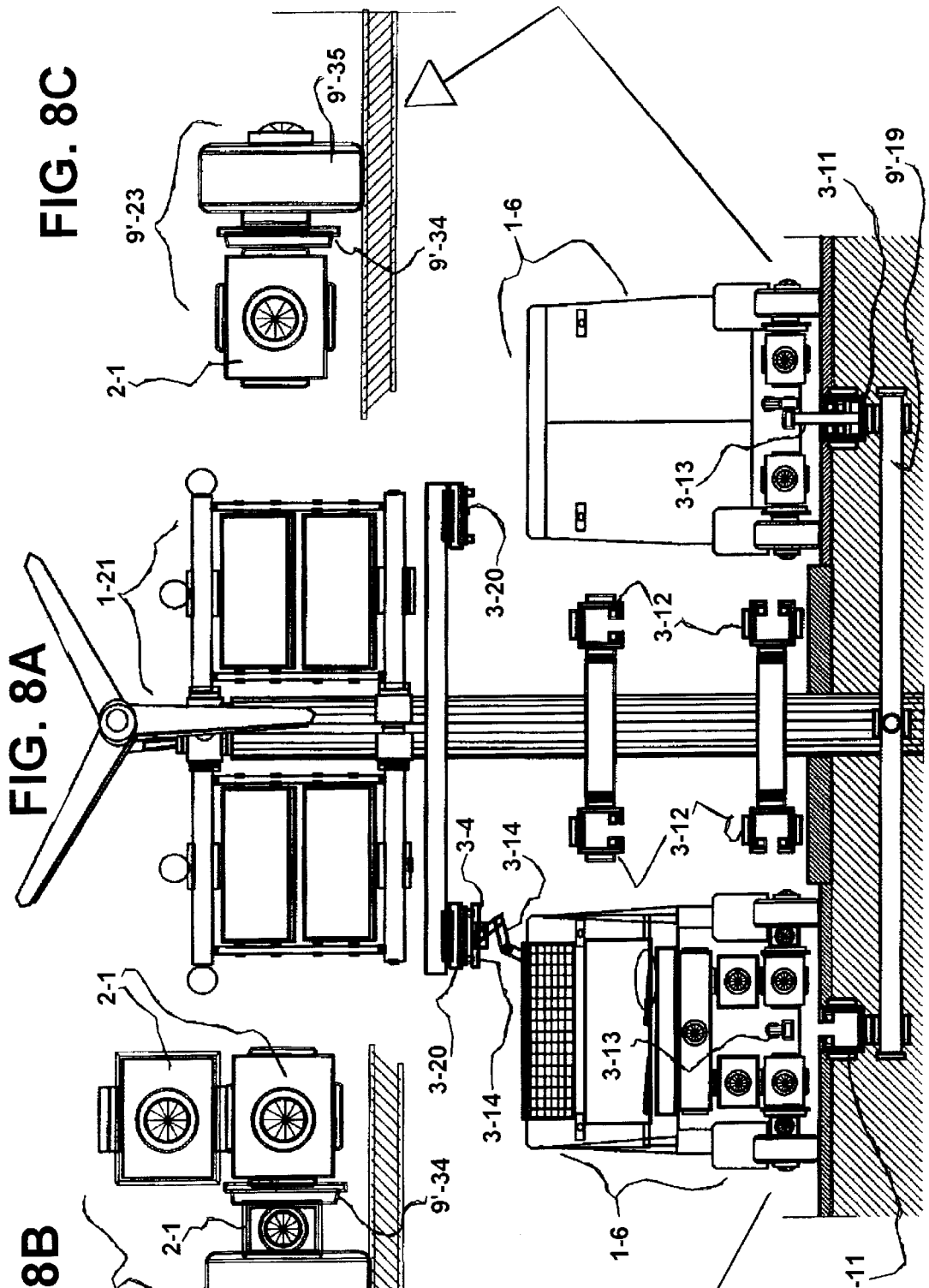

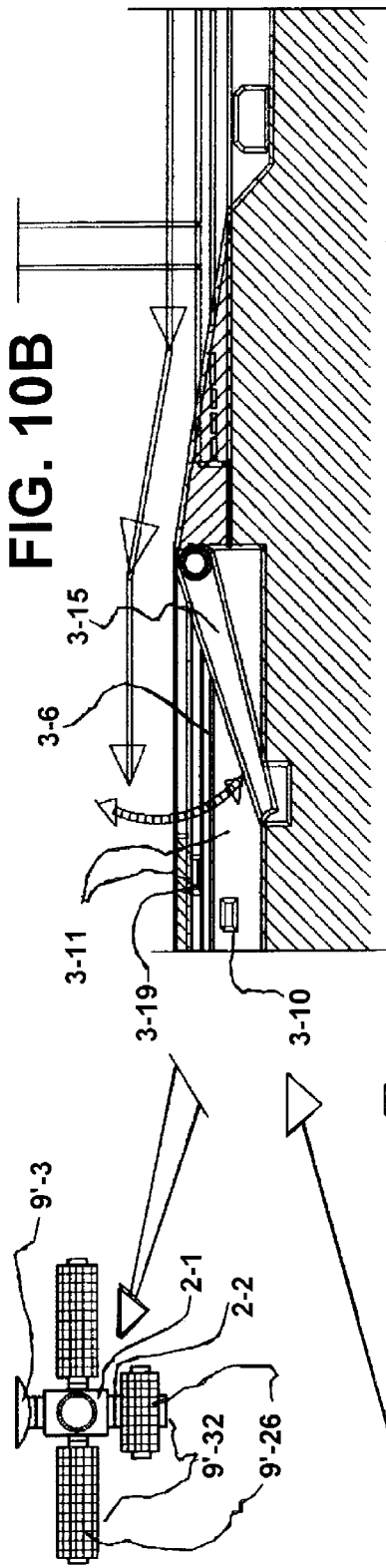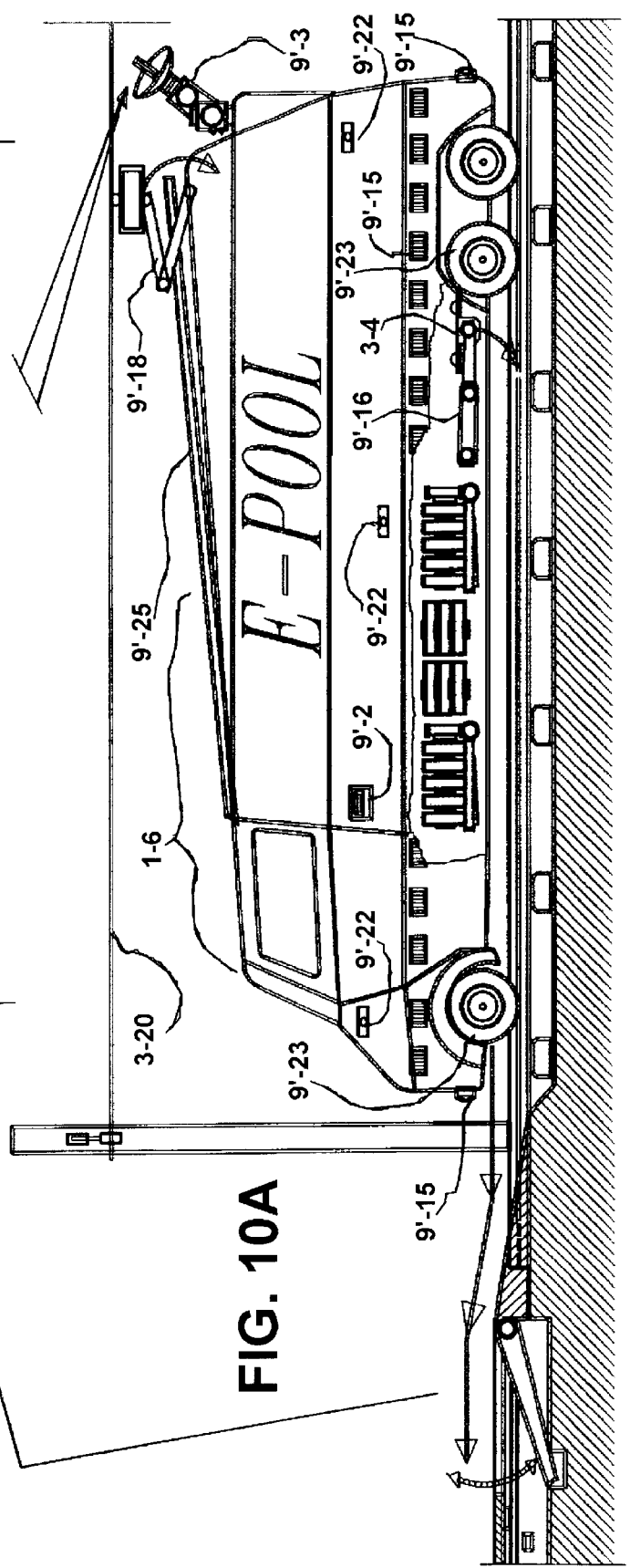

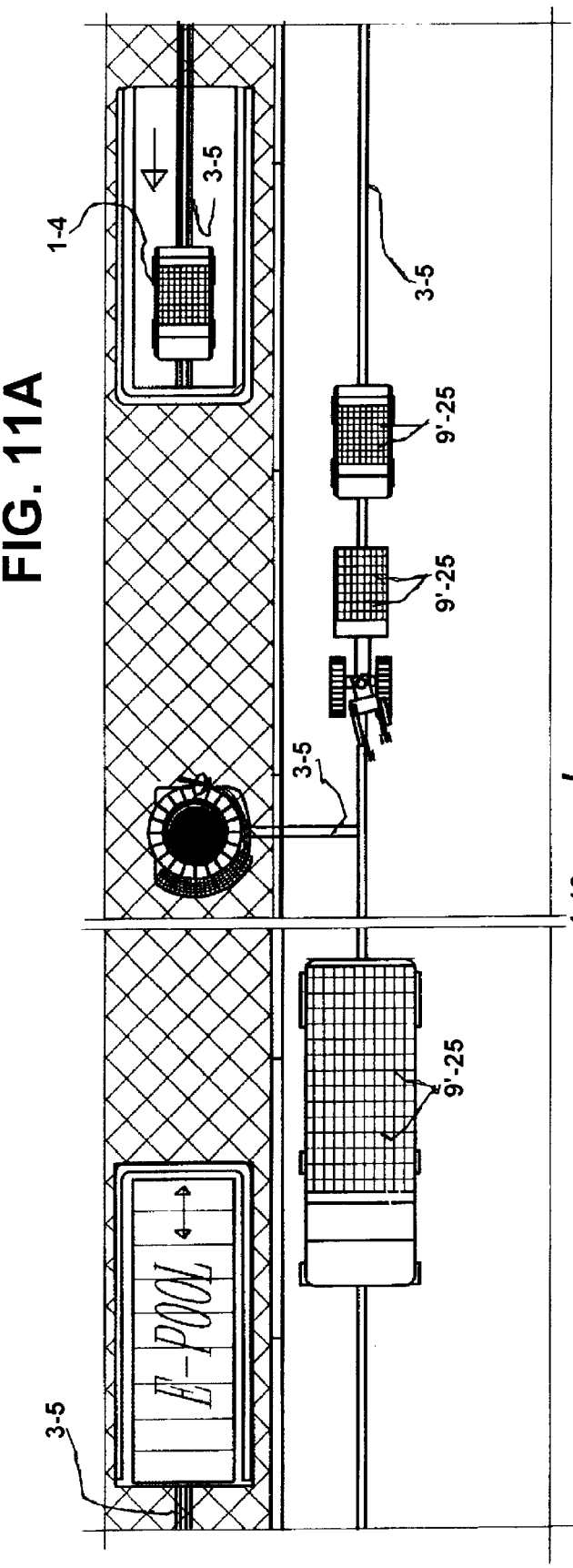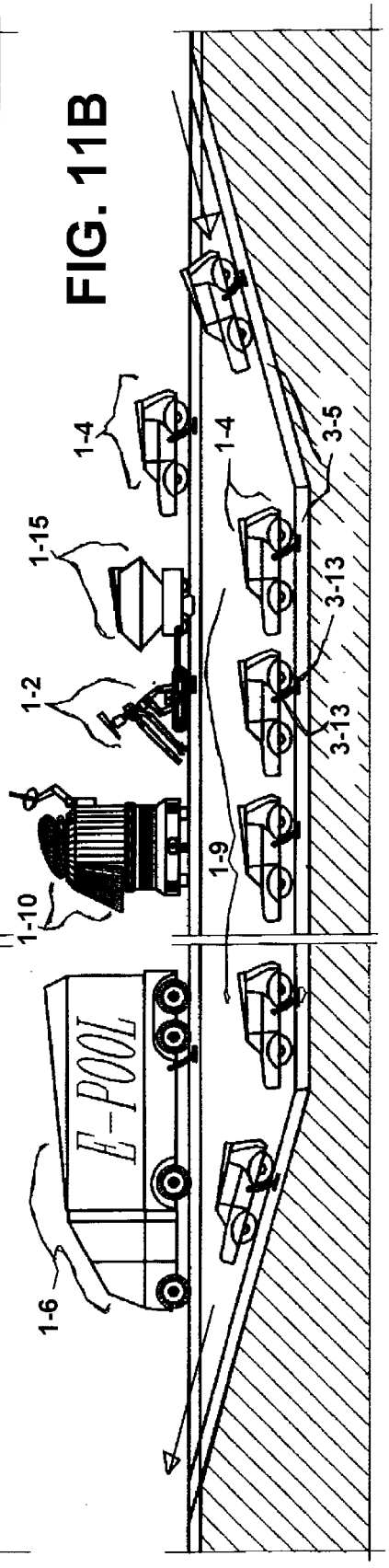

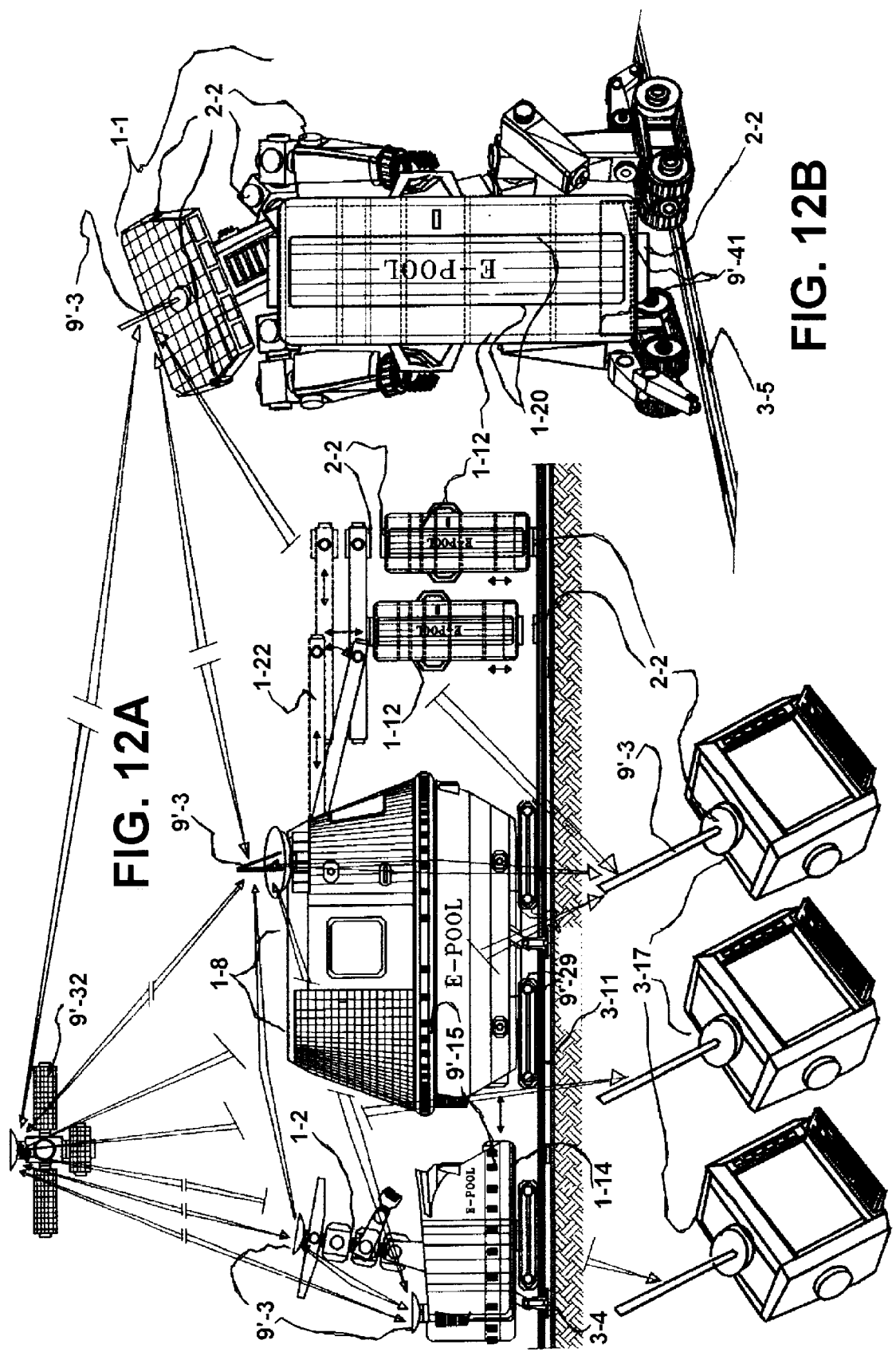

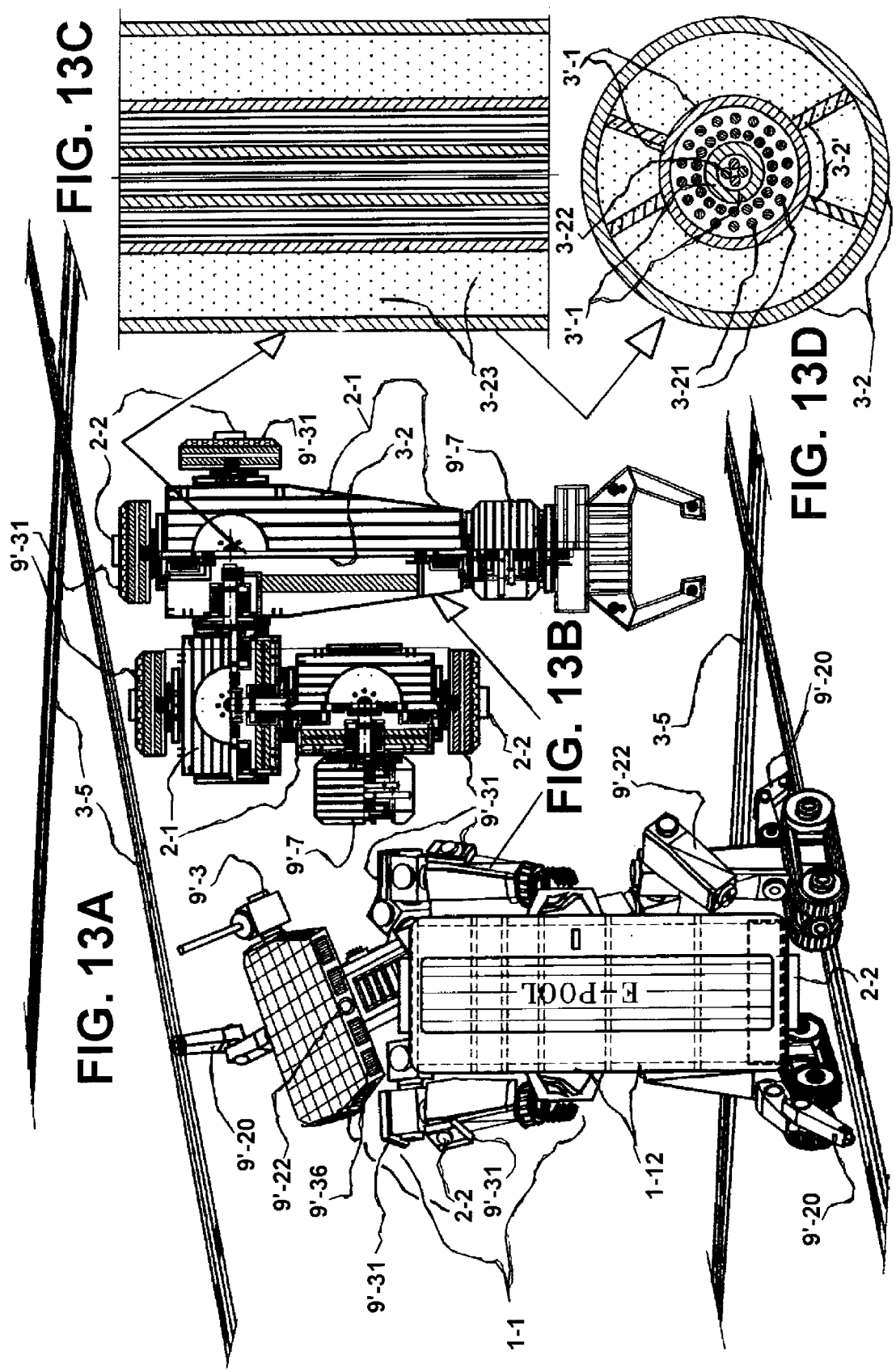

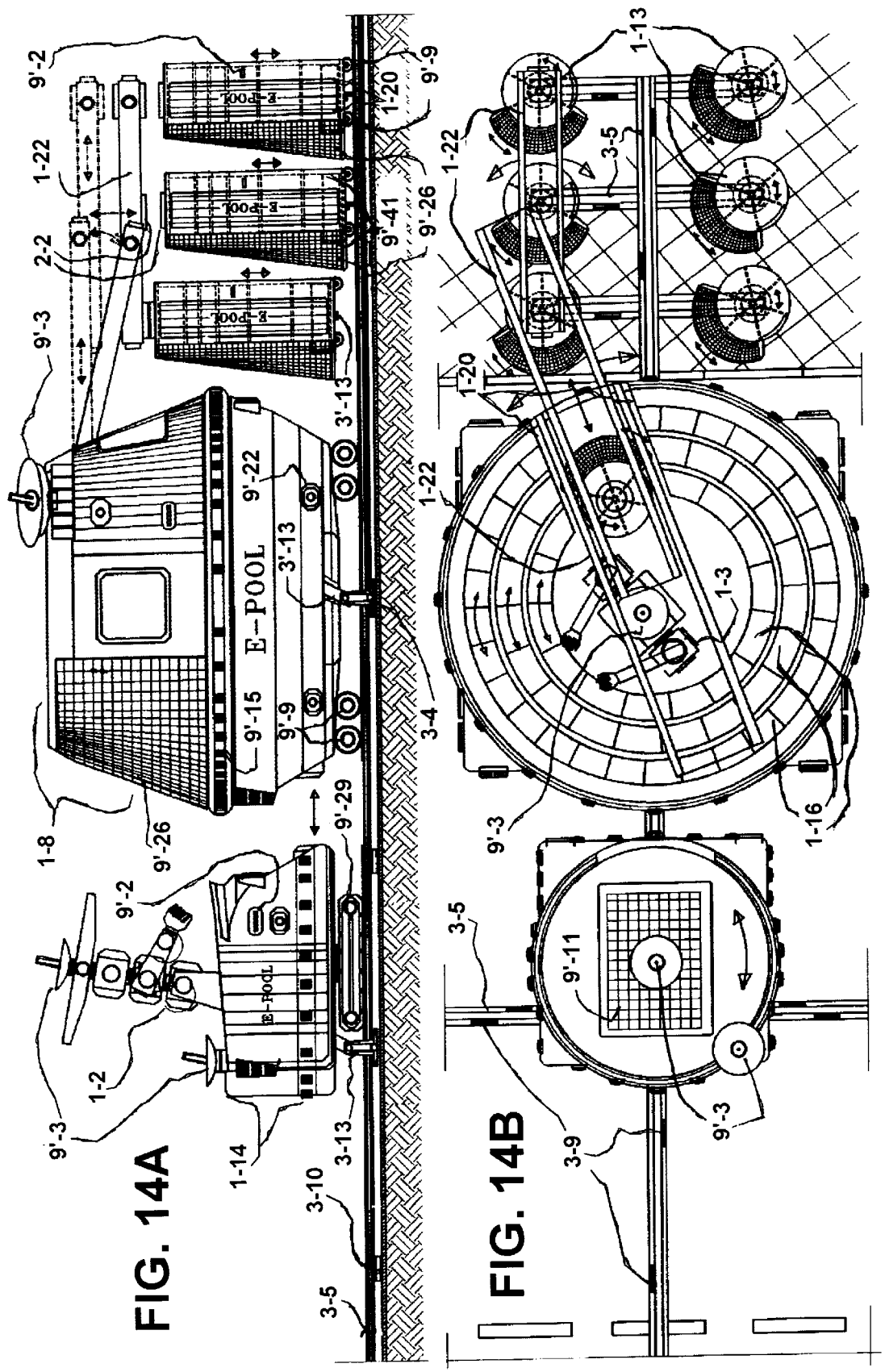

MULTIBLOCK ROBOT SYSTEM

BACKGROUND OF THE INVENTION

1. Field of the Invention

This application relates to multiblock robot prodcution and distribution networks for fully self operating productions, traffic, transport and distribution logistics.

2. Description of the Prior Art

Multiblock robot systems are known, in accordance with U.S. Pat. No. 5,241,875, EP 0547421 B1, U.S. Pat No. 5,850,762 and U.S. Pat. No. 5,852,353, U.S. Pat. No. 6,014,597. These systems are very useful with respect to the standardisational effect of entire robot systems for the most different objectives, composed of nearly the same designed mutliblock standard parts which can be assembled and disassembled with minimal expenditure for development and construction, and which can be exchanged mutually, but effortlessly, from the original spectrum of operations to any other robot system solution. Furthermore are known displaceable shelf arrangements, with work units and robot system cell units, and with the advantage of optimal space efficiency and short operation ways., in accordance with, U.S. Pat. No. 4,232,988, U.S. Pat. No. 4,252,488, DE 26 54 194, DE 29 38 227 and EP 0306787.

General definition of the throughout used designations and abbreviations:

- E-POOL—A regional and supraregional, self operating network, on earth, in nautics and in outer space, comprising all production, traffic and distribution systems, composed of multiblock systems;
- E-STOP—A road installation for self operating battery exchange and recharge operations of electric multiblock distribution systems, vehicles and robots;
- Self operation—E-POOL transaction process chains are running collision free, with operational reliability, without any need for manual interferences—Further definition under FIGS. 1 and 2;
- Socket flange booster chambers—Plug compatible accessory parts of multiblock standard parts;
- Standard parts—Basic multiblocks, all of nearly the same design and function. Every multiblock standard part has flange plug connections and internal current, communication and supply channels;
- Systems—Composed of plug compatible multiblock standard parts, booster chambers, multiblock units;
- Units—Composed of Individual multiblock standard parts and booster chambers;

SUMMARY OF THE INVENTION

It is an object of the present invention to extend further the advantages of standardisation, economical production, functionality and fields of user applications by providing a minimal number of additional multiblock standard parts and thus, generally increasing the number of pieces, and by integration of displaceable shelf elements with work units and robot system cell units, reaching fully self operating E-POOL productions, traffic and distribution logistics, whose individual components are applicable on earth and moreover in nautics and in outer space.

These objects are attained in accordance with the present invention, by providing electric and electronic E-POOL networks, consisting of multiblock individual computer units, central computers, board computers, satellite units, antenna units, open and contact protected under floor and upper floor current and communication supply lines with internal control point identification marks, position and direction code train guide-ways composed of thin-coat varnish and thin layer metalised adhesive foils with integrated induction conductors, which are deposited on the road and street surfaces and identical to the road and street surfaces deposition, on the upper side of the contact protected current and communication supply lines. The electric and electronic E-POOL networks being far-reaching energy independent and having continuous data exchange to all E-POOL network members by means of multiblock robot standard parts with its internal current and communication supply lines, in interconnection with roof solar units, segment solar units, solar and wind power installations, as also with battery supplying E-STOPS, composing a self operating E-POOL compound, integrating multiblock transport robots, road and street operation robots, service robots, multiblock robot service vehicles, traffic and transport group arrangements with individual cars and vans, heavy load transporters, busses, rail-road-street transporters, distribution group arrangements with mobile production and composition group arrangements, delivery and direct withdrawal group arrangements, mobile and stationary refrigerator and distribution boxes, as also stationary production and composition group arrangements. E-POOL users, equiped with E-POOL computer units and to these compatible E-POOL order software, are transmitting orders and instructions to the E-POOL central computers for deliveries and services, which are immediatly, self operating produced from the E-POOL compound, composed, distributed and transported to the aimed destination and the precise position of a company ground, an institutional building, a house entrance, to an apartment entrance, and to any other predetermined destination.

This arrangement is a considarable improvement over the prior-art systems, that by the development of these wide fields of applications, the variety, functionality and economical productions of the group arrangements of multiblock robots and of other self operating multiblock robot systems, is even more increased. Moreover, for the individual traffic and freight traffic, accidents with damage of persons and materials, are totally eliminated by the autonomously, without any manual interferences running process chains. Additionally, the attractivity is increased, because the entire system works CO2 free, the total energy balance is more advantageous, and the energy consomption lower, than of the traffic and transport logistics of production and distribution components of conventional systems. The individual and personal procurement and purchase rides are not any longer carried through. The goods are delivered by means of space optimized high speed robot system cell units and are streamlined coordinated with other equally conceived orders. Likewise, the means of traffic and transport are reduced in its number. A well balanced use of existing railway trackages and roads is reached. The asphalt works and the road and street expansion can be reduced, the traffic noise is restricted, the air and the climate, the whole environment is decisively ameliorated. Moreover, the integrated production and composition systematic of the space optimized high speed multiblock robot production group arrangements is very economical and reduces the requirements for operation areas in a region. Individual group arrangements and system components, as also the entire system, are directly applicable for the most different objectives on earth, but additionally in nautics, for self operating, tightly shut, multiblock under water stations, and they are necessary for the economical realization of space enterprises and the installation of space stations. The entire system can directly be installed as autonomous multiblock robot outer space station on other planets, with the particular aspect of total standardisations throughout the whole system, with the compatibility and exchangeability of all multiblock standard parts, rotation flange plug connections and system cell units, to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 2A, 2B, 2C, is the sectional side view of a contact protected under floor current and communication supply line with entrance-exit pivoting units, in the moment of exit pivoting movement, of the current and communication commutator carriage of an E-POOL individual car, the front and rear view of two E-POOL vans and, to the drive direction laterally positioned, a contact protected under floor current and communication supply line with energy supply by means of multiblock-solar-wind power stations; the front view of an E-POOL van with sectional view through a contact protected under floor current and communication supply line and of the energy supply by means of laterally to the drive direction positioned mutliblock-solar-wind power stations;

FIGS. 3A, 3B, is the perspective view of an E-POOL vehicle chassis with engagement of the current and communication commutator carriage to a contact protected under floor current and communication supply line; the detail of the position and direction code train guide-way;

FIGS. 4A, 4B, is the plain view of an E-POOL individual car and the motion cycle for the changement of drive to the lateral direction, with the detail of a pivoting inside compartment; the side view with a perspective detail of a pivoting inside compartment

FIGS. 8A, 8B, 8C, is the front view of a middle strip sector of the expressway in accordance with FIG. 7, with two rail-road-street transporters; the detail of the rail-road-street and street wheel units;

FIGS. 10A, 10B, is the side view of an E-POOL rail-road-street transporter and data exchange with the E-POOL satellite units; a rail-road respectively street driving up detail;

FIGS. 11A, B, is the plain and sectional view of train guide-way leaded traffic and distribution group arrangements; available E-POOL traffic and distribution group arrangements in an availability subway, at the roads side strip;

FIGS. 12A, B, is the side view of a distribution group arrangement, coupling with a multiblock robot service vehicle and preparation of a stationary refrigerator and distribution box, as also the data exchange with the E-POOL central computers and the E-POOL satellite units; the perspective view of a multiblock transport robot, transporting a stationary refrigerator and distribution box;

FIGS. 13A, B, C, D is the perspective view of an E-POOL multiblock transport robot with a floor and overhead train guide way, transporting a stationary refrigerator and distribution box; the detail of a robot arm with hydraulic socket flange booster chamber; the central train guide way channel of tie multiblock standard parts in a longitudinal, sectional view; the corresponding plain view;

FIGS. 14A, B, is the side view of a mobile production and composition group arrangement in accordance with the FIG. 12, preparing mobile, train guide-way leaded refrigerator and distribution boxes; the corresponding plain view;

Movement arrows in the FIGS. show the movement direction of the system parts, signal arrows show the direction of the data exchange and view arrows show the origin and the line of vision for system details, sub-views and sections of the respective FIGS.

DESCRIPTION OF THE PREFERED EMBODIMENTS

Figure 1:
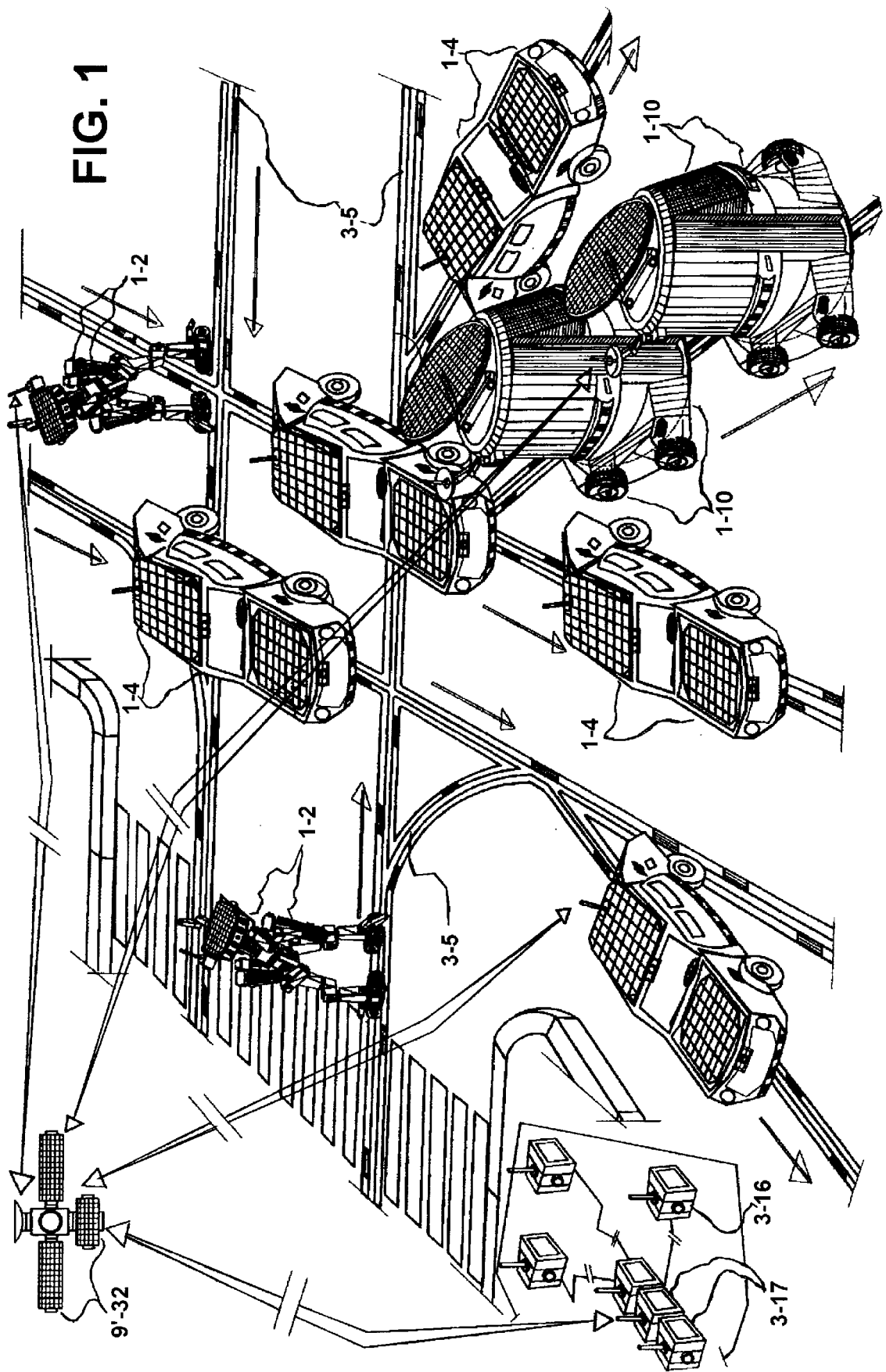
FIG. 1 is a perspective plain view of a street crossing with self operating E-POOL traffic, transport and distribution group arrangements, and of position and direction code train guide-ways, as also of the E-POOL network-data exchange.

Multiblock robot prodcution and distribution networks in accordance with FIGS. 1 and 2 are self operating. This means for the present invention, that after the users input of order commands via the E-POOL order software and the individual E-POOL computer units 3-16 with data exchange over the electronic E-POOL network, for precise deliveries, compositions and services, E-POOL transaction process chains are running collision free, with operational reliability, without any need for manual interferences, corrections, or operator supervisions, this also for leading back operations to the original availability positions, of the individual needed system group arrangements, after order accomplishment. However, the E-POOL system group arrangements are always reinstructable by means of new commands and order inputs, over users E-POOL computer terminals 3-16, and localy, directly at the system group arrangements, by means of speech reproduction codes and E-POOL user checkcards. In order to guarantee the operation reliable transaction process chains, the traffic, transport and distribution system group arrangements are leaded on position and direction code train guide-ways 3-5. The individuel E-POOL multiblock robots of an E-POOL compound are identical in its structure and construction. However they differ from each other by the different socket flange booster chambers 9 and 9' which, like the hydraulic socket flange booster chambers 9'-31 of the FIG. 13, are pluged on the multiblock robot standard parts 2-1, this in accordance with the objective and the requirement of the entire system. The shown E-POOL multiblock road and street operation robots 1-2, E-POOL individual cars 1-4 and E-POOL delivery-distribution group arrangements 1-10, are leaded on the position and direction code train guide-ways 3-5, having continuously data exchange with the E-POOL satellite units 9'-32, for the precise positioned order execution. Contact protected under floor and upper floor current and communication supply lines 3-11, 3-12 allow the needed power supply and the high-performance movements of the traffic, transport and distribution group arrangements, whereas the battery energy reserves remain saved. The need and the individual length of installation is determined by the energy consumption, particularly e.g., at lane upgrades, and wherever the needed power supply has to be increased. For this purpose, the traffic, transport and distribution group arrangements, shown as individual cars and vans, are provided with under floor and upper floor current and communication pivoting arms 3-13,3-14, with accessory current and communication commutator carriage 3-4 for the current connection from the under floor and upper floor current and communication supply lines 3-11, 3-12 to the drive units of the traffic, transport and distribution group arrangements. The current conductors of the under floor and upper floor current and communication supply lines 3-11, 3-12 are clamped at insulators 3-19 and so secured leaded. At the stretchs of the roads and streets, along the under floor and upper floor current and communication supply lines 3-11, 3-12, always at every final position and flush with its surface, are provided entrance-exit pivoting units 3-15, which permit the swing in and out of the under floor and upper floor current and communication pivoting arms 3-13, 3-14, to and from the under floor and upper floor current and communication supply lines 3-11, 3-12, without a drive interruption. For the comparisons of rated and actual positions of the E-POOL board computers 9-1, are provided internal control point identification marks 3-10, inside of the under floor and upper floor current and communication supply lines 3-11, 3-12, which are contactless scanned from pivoting-arms sensors 9'-20, in accordance with FIG. 3A, pluged laterally at the current and communication commutator carriage 3-4. The upper floor current and communication supply lines 3-12 are equal in its structure to the under floor current and communication supply lines 3-11, with integration of entrance-exit pivoting units 3-15, however, in relation to the under floor current and communication supply lines 3-11, they are arranged, displaced at 90° or 180°, in relation to the under floor current and communication supply lines 3-11, with a corresponding horizontal displacement at 90° of the upper floor current and communication pivoting arms 3-14 appertaining to the traffic, transport and distribution group arrangements and a corresponding displacement at 90° and 180° of the current and communication commutator carriage 3-4, which are engaged in the upper floor current and communication supply lines 3-12. The contact protected under floor current and communication supply lines 3-11, are provided with water discharge slots, positioned in distances to each other, for the discharge of rain water, to water discharge channels 9'-24, leaded directly below the under floor current and communication supply lines 3-11, these provided with sewage pumps 9'-33 in greater distances to each other and discharging the sewage water into the public canalisation. For the far-reaching autonomous current supply of the under floor and upper floor current and communication supply lines 3-11, 3-12, are used E-STOP multiblock solar and wind power stations 1-21, installed in center line position to the drive directions, but also laterally at the road and street sides, connected with the contact protected under floor current and communication supply lines 3-11, by means of socket flange booster chambers 9'-19.

In accordance with FIG. 3, the contact protected under floor and upper floor current and communication supply lines 3-11 having position and direction code train guide-ways 3-5, which are provided in thin-coat varnish and thin layer metalised adhesive foils, to the left and to the right of the engagement slot for the under floor current and communication pivoting arms 3-14, and which are exactly identical to the position and direction code train guide-ways 3-5, deposited on the road and street surfaces, in accordance with FIG. 1. In so far, the under floor current and communication supply lines 3-11 can be installed, at any places, in anly length, straight lined or curved, for position and direction code train guide-ways 3-5 marked roads and streets, without that, at the final swing in, swing out position of the there positioned entrance-exit pivoting units 3-15, are arising orientation problems for the pivoting-arms sensors 9'-20, which are scanning contactless the direction course of the position and direction code train guide-ways 3-5, and are transmitting the control signals to the board computers 9'-1 or the corresponding steering adjustment of the multiblock robot drive units 9-9, 9-23, 9-29. The direction code train guide-ways 3-5, having moreover, to the left and to the right of the there remaining free, center lined strip unit, in the width of the engagement slot for the under floor current and communication pivoting arms 3-14, always centrally, a longitudinal, continuously traversing additional metalised thin-coat varnish, the inductive strip 3-8, which marks the drive direction and which is contactless scanned by the pivoting-arms sensors 9'-20. To the left and to the right of the inductive strip 3-8, in distances to each other, are additionally position identification marks 3-9 varnished, or in thin layer metalised adhesive foils deposited on the direction code train guide-ways 3-5. The position identification marks 3-9 mark the position points along the position and direction code train guide-ways 3-5 and are likewise contactless scanned from the pivoting-arms sensors 9'-20, and the position signals are transmitted to the board computers 9'-1 for the continuous comparison of rated and actual positions. In addition to the position identification marks 3-9, control point identification marks 3-10 are varnished and deposited in thin layer metalised adhesive foils, which, in the moment of reaching and scanning from the pivoting-arms sensors 9'-20, are transmitting control informations to the board computers 9'-1 and to the central computers 3-17, especially if reaching the position marks of the entrance-exit pivoting units 3-15 and for the self operating swing in and swing out of these units, in the case that the under floor current and communication pivoting arms 3-14 have to be pivoted to or from the under floor current and communication supply lines 3-11. The metalised thin-coat varnish and the thin layer metalised adhesive foils with the inductive strips 3-8, the position identification marks 3-9 and the control point identification marks 3-10, have inductive properties, so that they can be scanned contactless by the pivoting-arms sensors 9'-20 without signal information losts, even in the case of soiling. Depending on the road and street conditions and also for temporary train guide marks, thin layer metalised adhesive foils, with identical properties as provided for the varnished metalised thin-coats, are glued on the roads. The water discharge channels 9'-24, leaded directly below the contact protected under floor current and communication supply lines 3-11, have a conical structure in bottom direction and show the water discharge fitting with the multiblock-water discharge pump 9'-33 and the discharge into the public canalisation. The under floor current and communication pivoting arms 3-14 are plug connected, exactly in central back position on rotation flange plug connections 2-2 of the chassis frame 9'-8, which is equiped with the multiblock drive units 9'-9, 9'-23, the wheel sensors 9'-10, the chassis sensors 9'-21 and to these belonging rotation flange plug connections 2-2, so that the chassis frames 9'-8 are always centrally positioned to the direction code train guide-ways 3-5.

Figure 5:
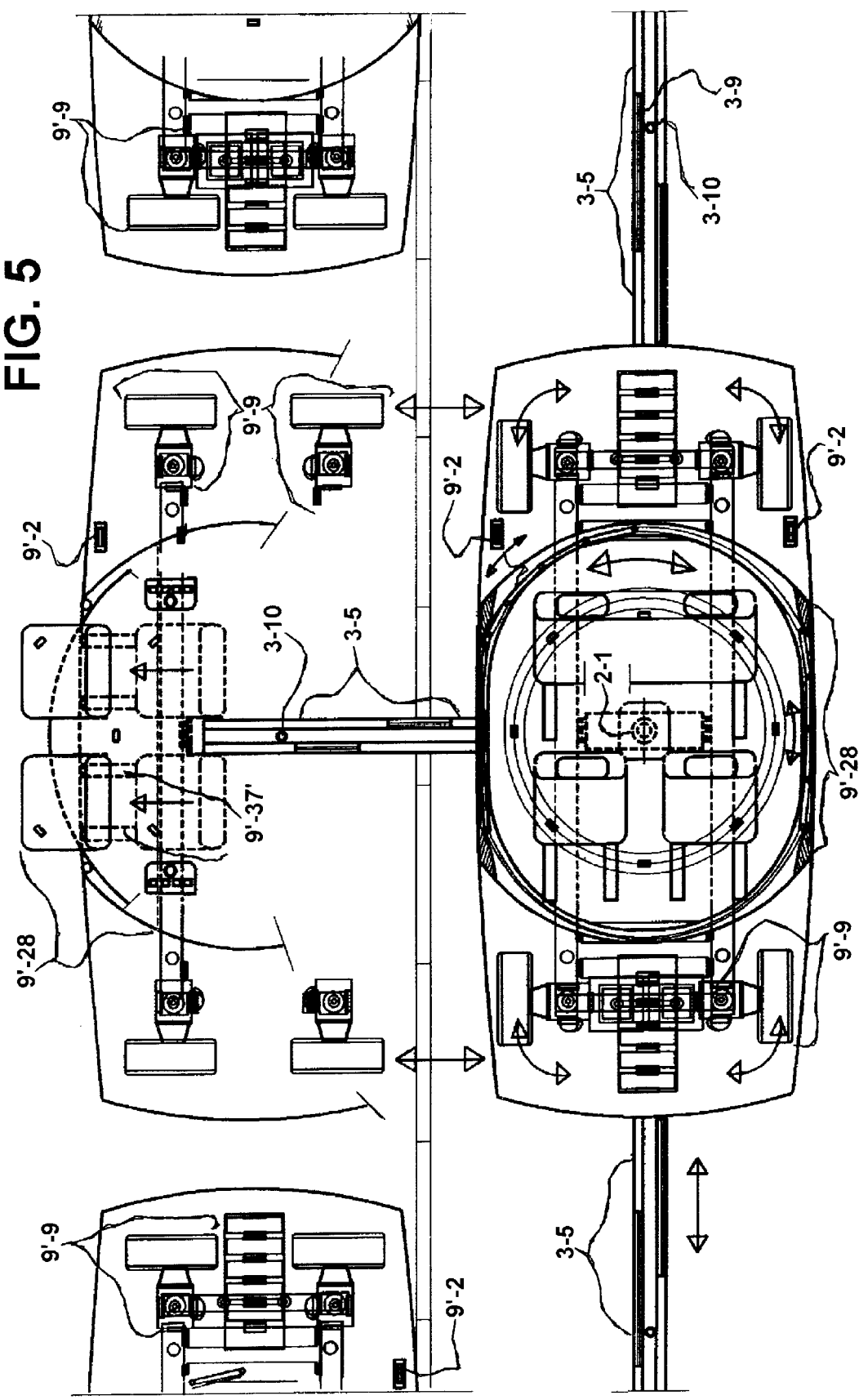
FIG. 5, is the plain view of an E-POOL individual car and the motion cycle for the changement of drive to the lateral direction, for a parking operation.

In accordance with FIGS. 4 and 5, the E-POOL traffic, transport and distribution system group arrangements receive pivoting inside compartments 9'-28, instead of the usually used doors. These are pluged on central multiblock robot standard parts 2-1, which ensure the rotational drive, pivoting the inside compartments 9'-28 freely to the left and to the right, at 360°, whereas the outside support during the pivoting movements, is accomplished by the annular chassis tracks 9'-38, with its annular roller supported step bearings 9'-39. The pivoting inside compartments 9'-28 are provided with an automobile body cover structure 9'-37 with side-window insertion. The automobile body cover structure 9'-37 is in general adapted to the respective automobile body of the E-POOL traffic, transport and distribution system group arrangements. They are sealed off at the transition to the automobile body front and rear side, by means of longitudinal roller sealing rubbers 9'-28', closing the automobile body cover structure 9'-37 tightly to the outside, during the swing-in state, ready for drive. The inside walls of the automobile body cover structure 9'-37, have to the left and to the right, beside the seats, manually commanded control units 9'-2'which comprise steering control units, for the manual steering take over of the users at every time, thus disconnecting the self operating functions. Additionally, there are provided input keyboards and multiblock robot speech reproduction control units, for the command dialog with the board computer 9'-1. Furthermore, there is inserted an E-POOL checkcard reader unit 9'-2 for a second necessary control check of a user justification, apart from the first control check of a user justification, by means of the E-POOL checkcard reader units 9'-2 which are inserted at the outer contour of the car bodies and which, in the event of a vehicles possession take over by the E-POOL users, verify the E-POOL users justification, switching free the respective vehicle for entrance operations, followed by the release of the swing-out process of the automobile body cover structures 9'-37, for the comfortable and unhindered entrance. The automobile body cover structures 9'-37 receive for the traffic, transport of objects, loads, robots and persons, the corresponding interior equipment like pallets, load forks, load elevating devices, containers, conveyor belts, two or more seats for persons. In the present case, the individual cars 1-4 have two seats for persons with free room to the back side, for the reception of objects. For the impeccable and accurate finding of the positions for accommodations and depositions, in self operating mode, likewise for self operating parking-in and parking-out, the position and direction code train guide-ways 3-5, with the position identification marks 3-9 and the control point identification marks 3-10, are also applied to sidewalks, in 90° to the road and street tracks. The reception and deposition of objects, loads, robots and persons being carried out, laterally to the normal drive direction. The vehicle is being braked and from the standing position, the four drive units 9'-9 with the wheel units are completely pivoted at 90°, so that the individual car 1-4 drives directly to the exact reception-deposition place, without any need of multiple drive up and drive back corrections. The automobile body cover structures 9'-37 are being pivoted at 90°, so that the lateral access openings are free. The seat or load unit is sliding in front position by means of the slide-in, slide-out unit 9'-37', up to the range that an unhindered entrance-exit and take over of objects and loads is possible. In the case of reentrance, the E-POOL user checkcard is being inserted into the outside checkcard reader 9'-2 and the automobile body cover structures 9'-37 is being pivoted at 90° for the entry of persons.

Figure 6:
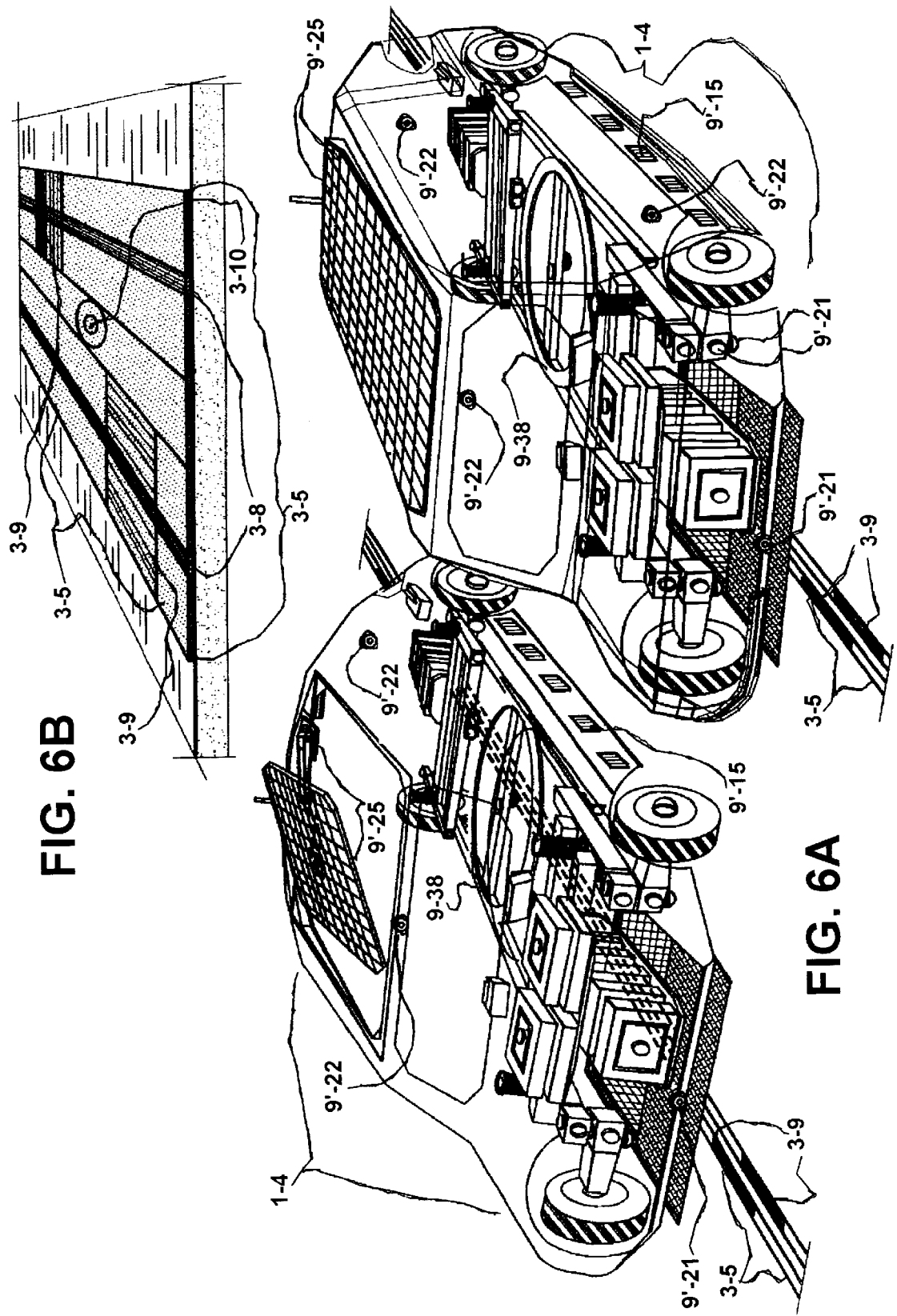
FIGS. 6A, 6B, is the perspective plain view of two E-STOPS with an individual car and a van, and the train guide by means of a direction code train guide-way; the detail of a position and direction code train guide-way.
Figure 7:
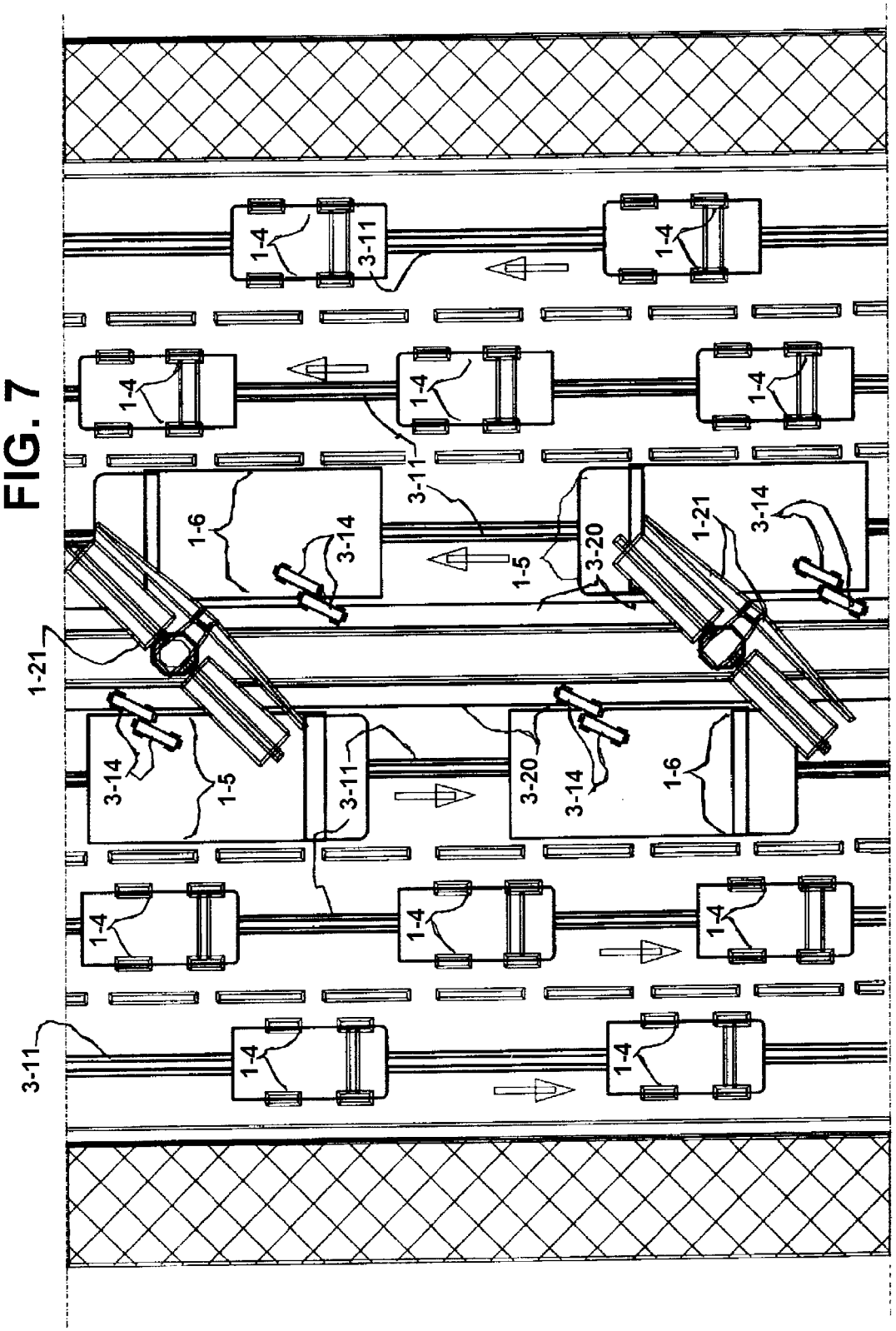
FIG. 7, is the plain view of a multi-track expressway, on the middle strip with CO2 free E-POOL energy supply and on the both sided roads, the train guide by means of a position and direction code train guide-way of contact protected under floor current and communication supply lines, as also of contact protected upper road and street current and communication supply lines.
Figure 9B:
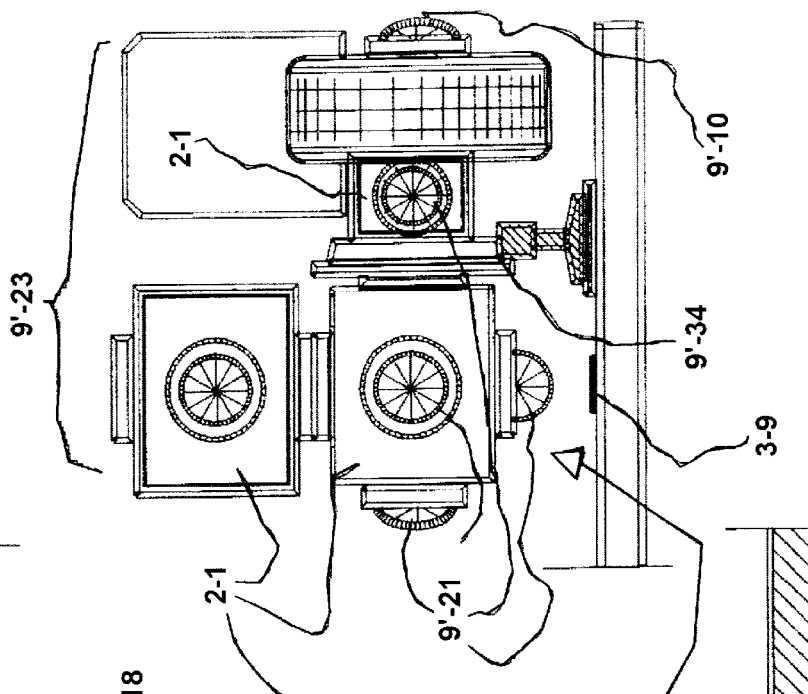
FIGS. 9A, 9B, is the front view of an E-POOL rail-road-street transporter in accordance with the FIG. 8, on a rail body with open overhead current and communication supply line; the detail of a rail-road-street and street wheel unit on the rail body.
Figure 9A:
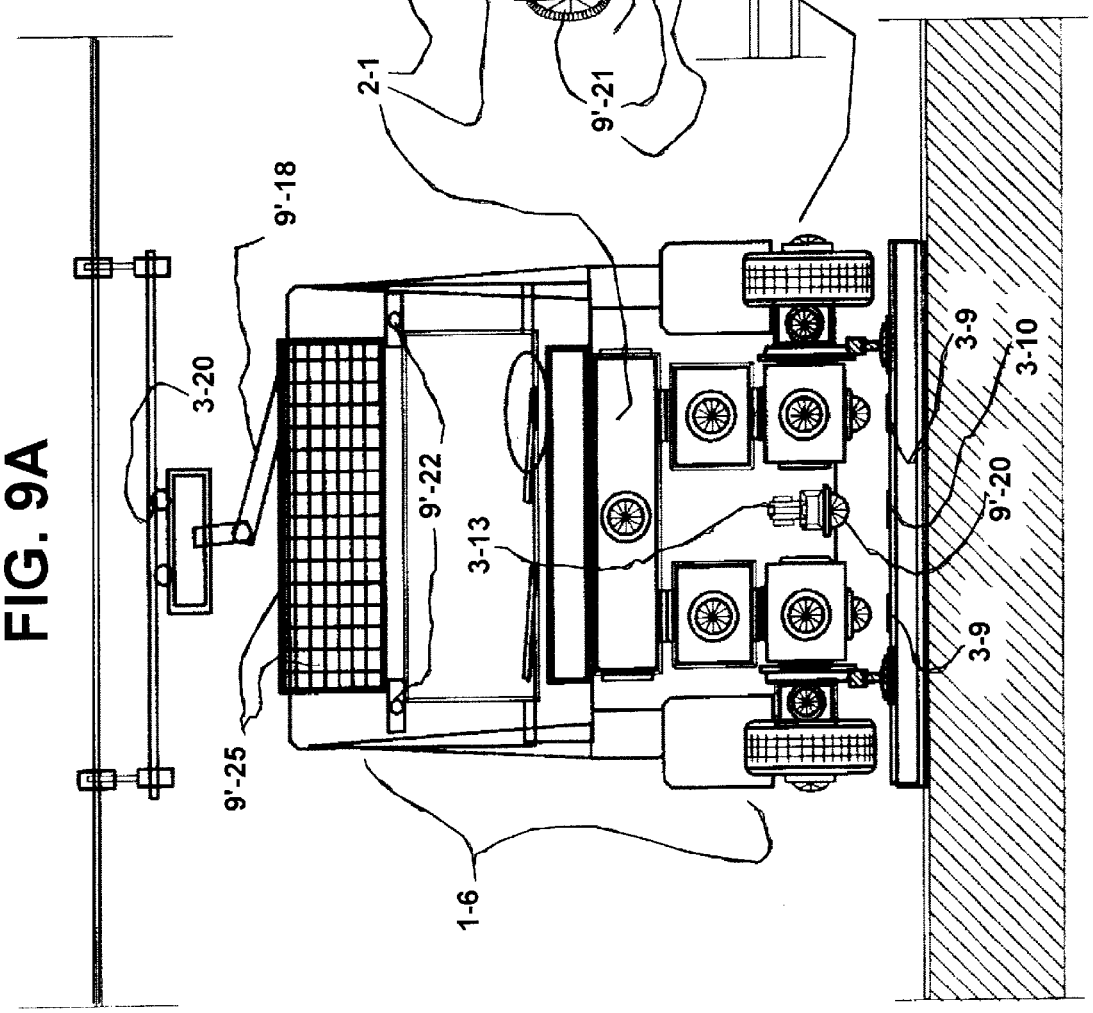

In accordance with FIG. 6, the access and departure, as also the position operations of vehicles at E-STOPS for the battery exchange or for the battery recharge, is likewise carried through precisely, without any shunting movement requirements, by means of the position and direction code train guide-ways 3-5, with the inductive strips 3-8, the position identification marks 3-9 and the control point identification marks 3-10. The traffic, transport and distribution system group arrangements, in this case an individual car 14 and a van 14 are equiped with sensor outside rings 9'-15 having sonar and infrared sensors for locating of objects and persons. Additionally there are provided image recognition units 9'-22 at the sidewalls in front and back position, so that by means of the sonar, infrared and image evaluation of the board computers 9'-1, the environment of the vehicle is being continuously analysed for finding mobile or stationary obstacles and if necessary, brake and slow down control commands are transmitted to the drive units 9'-9. At the same time, the distance to objects, mobile obstacles, as also to vehicles in front of the own, are constantly messured by means of the chassis sensor units 9'-21 and the speed being correspondingly adapted by means of the board computers 9'-1. The annular chassis tracks 9'-38 are exactly positioned in the center line of the vehicles, resting on the vehicles chassis 9'-8. The E-POOL traffic, transport and distribution system group arrangements are equiped with pivoting roof solar units 9'-25, which in stand position are continuously pivoted to the accurate vertical, energy optimal utilization direction, of the sun beams. At the departure, the roof solar units 9'-25 are again self operating pivoted to the original position, plain to the level of the vehicles roof In accordance with FIGS. 7 to FIG. 10, for multi track expressways, the center strip is being used for multiblock solar and wind power stations 1-21, having along the tracks, open current and communication supply lines 3-20 and upper floor current and communication supply lines 3-12, for overhead current support of the heavy load transporters and busses 1-5 and of the rail-road-street transporters and busses 1-6, by means of the upper floor current and communication pivoting arms 3-14. The different E-POOL traffic, transport and distribution system group arrangements, as the individual cars and vans 1-4, the heavy load transporters and busses 1-5 and the rail-road-street transporters and busses 1-6, can optionally enter and exit each of the road and street tracks and use in each road and street direction and in each track, the position and direction code train guide-ways and the current and communication supply lines 3-11. For the shown road or street length of the FIG. 7, each track is equiped with a contact protected under floor current and communication supply line 3-11. The rail-road-street transporters 1-6 of the FIG. 8 show the access options to the current and communication supply lines 3-11, 3-12, 3-20 and they are current supplied in one direction from the open, current and communication supply lines 3-20 and the upper floor current and communication pivoting arms 3-14 and in opposite direction, from the contact protected under floor current and communication supply lines 3-11 and the under floor current and communication pivoting arms 3-13. The use for the direct energy supply without limitations, of the contact protected upper floor current and communication supply lines 3-12, laterally arranged to the multiblock sun and wind power stations 1-21, is likewise possible. By means of rotation flange plug connection, the upper floor and under floor current and communication supply lines 3-11 and 3-12, are directly connected with the current and communication channels, of the centrally to the road or street tracks installed multiblock solar and wind power stations 1-21. The rail-road-street transporters 1-6 are equiped with rail-road-street and street wheel units 9'-23, for which the rail wheel 9'-34 is being arranged in accordance with the rail guidance and drive arrangement, whether the rail wheel 9'-34 in axie direction, directly beside the road and street wheel 9'-35, or through interposition of a multiblock standard part 2-1. The rail wheel 9'-34 and the road and street wheel 9'-35 can also be arranged separately, one behind the other and in accordance with the use, rail or road and street, the respective needed wheel is being pivoted in upper or in lower position, and in the same way as for the current and communication pivoting arms 3-14, pivoted by means of multiblock standard parts 2-1. In the case of rail ride, the rail wheels 9'-34 have contact with the rails and the road and street wheels 9'-35 being pivoted to the upper position and in the case of road and street drive, if the road and street wheels get contact with the roads and streets, the rail wheels being pivoted to the uper position. The rail ride situation of FIG. 10 shows, that there the position identification marks 3-9 and the control point identification marks 3-10 are deposited on the sleepers of the rail body, and they are contactless scanned from the multi-block standard parts 2-1 sensors 9'-20, 9'-21, of the under floor and upper floor current and communication pivoting arms 3-13, 3-14. The current and communication supply is provided by means of the open overhead current and communication supply lines 3-20, through the roof current and communication pivoting arm 9'-18. At the transition from the rail to the road and street and likewise from the road and street to the rail, begins, respectively ends the course of a contact protected under floor current and communication supply line 3-11, with an entrance-exit pivoting unit 3-15. There, the road and street wheel units 9'-35 drive up the ascent slope to the road and street lane and the rail wheel units lose the engagement with the rails. Simultaneously, the roof current and communication pivoting arm 9'-18 is pivoted out, and the vehicle being disconnected from the open overhead current and communication supply lines 3-20, and the under floor and upper floor current and communication pivoting arms 9-16, 3-13, 3-14 with its current and communication commutator carriage 3-4 are pivoted into the under floor current and communication supply lines 3-11. After this operation, the entrance-exit pivoting unit 3-15 is pivoted to the close position, flush with the roads and streets lane. Also on the rails, the rail-road-street transporters and busses 1-6, have always constantly data exchange with the entire E-POOL network by means of the E-POOL satellite units 9'-32 with its rotation flange plug connections and antenna units 9'-3. For strictly keeping, of the compatibility and exchangeabiltiy over all basic unit assembly groups to each other of the whole E-POOL compound, all multiblock standard parts 2-1, the rotation flange plug connections 2-2, the socket flange booster chambers 9', are identical in its structure to each other. So that also for the most different fields of applications, as for the rail-road-street wheel units 9'-23 with the belonging rotation flange plug connections 2-2, the identical structure is maintained. E.g. to the E-POOL satellite units 9'-32 and to its multiblock standard parts 2-1 with the belonging rotation flange plug connections 2-2, which there as drive units, are performing the pivoting operations of the solar surfaces in accordance with the sun beam directions and if necessary, only the construction dimensions are different. The multiblock robots 1-1, 1-2, 1-3, as also all the other traffic, transport and distribution group arrangements, can always leaf the position and direction code train guide-ways 3-5. They are able to reach idividually and self operating the targets, or predestinated objectives, and to execute ordered functions, by use of the E-POOL satellite units 9'-32 guide systems, the control sensors and the board computers 9-1 assistance, whereas all operations are energy supported by means of the own multiblock battery units. E-POOL justified users and passengers of the E-POOL individual cars 14 and of the other traffic, transport and distribution group arrangements, are self operating checked-out if leaving the position and direction code train guide-ways 3-5, ore checked-in, if entering the train guide way compound. For check-in operations, the users are asked by multiblock robot speech reproduction units to input the E-POOL user codes and the target of the ride. The board computer 9-1 computes the probable duration of the ride and gives in a user dialog more answers, as for the fare and a description of the way for reaching the ordered targeted position. If the user approves the quotation and declaration of the board computer 9-1 for the ride, the autopilot drive is being accomplished self operating, without any manual interference of the user, up to the final position. E-POOL compatible private vehicles are justified at every time to use the self operating E-POOL compound, the position and direction code train guide-ways 3-5 and the contact protected under floor and upper floor current and communication supply lines 3-11, 3-12, if the users are in possession of the E-POOL user checkcard and by input of the user justification code to the respective board computer 9-1, so they are able to switch over from manual steering to order control, means totally self operating, autopilot drive to the targeted position, without any need for the drivers intervention.

In accordance with FIG. 11, for the stand by of E-POOL traffic, transport and distribution group arrangements, E-POOL availabilty subways 1-9, also used for maintenance and battery recharge operations, are provided and installed laterally to the roads and streets. For this, the E-POOL availability subways 1-9 are equiped with contact protected under floor current and communication supply lines 3-11 and with E-STOPS. The entrance and exit openings are horizontally dosed by roller doors which are driven by multiblock drive units 2-1. The multiblock street operation robots 1-2 dean and remove drive obstacles, provide new installations of contact protected current and communication supply lines 3-11, 3-12 and position and direction code train guide-ways 3-5, executing these works on its own belt and wheel drive units 9'-29, 9'-9, but also by means of multiblock robot service vehicles 1-14, driving ahead of position and direction code train guide way laying-containers 1-15, which are coupled to the multiblock robot service vehicles 1-14. The position and direction code train guide way laying-containers 1-15 contain varnish material for the varnished metalised thin-coats of the position and direction code train guide-ways 3-5, as also thin layer metalised adhesive foils composed of roll material, and in speedy operation cycles of vamisch marking and roll material laying road and street machines, positioned and controlled by the street operation robots 1-2, they mark and lay down the position and direction code train guide-ways 3-5, precisely and in exact positions on the roads and streets with optional directions, curves and ascents, In accordance with FIGS. 12 and 13, the E-POOL distribution group arrangement 1-8 of FIG. 12 takes care of the stationary refrigerator and distribution boxes 1-12, transfering these to the inside room of the distribution group arrangements 1-12, by means of the telescopic carrier 1-22, for replenishment, preparation of ordered goods like food, and after this, retransfers the stationary refrigerator and distribution boxes 1-12 to the outside for setting down operations on availability rotation flange plug connections 2-2. Accordingly, the stationary refrigerator and distribution boxes 1-12 have at the bottom, as also in the range of the roof, rotation flange plug connections 2-2 for availability depositions and take over operations. The telescopic carriers 1-22, are equally provided with congruent rotation flange plug connections 2-2 and are able to pick up, transfer and to deposit, two of the stationary cool and distribution boxes 1-12, at the same time together. A multiblock transport robot 1-1, taking over the stationary refrigerator and distribution boxes 1-12 and transporting these, train guided to the ordered destination. Furthermore, a multiblock street operation robot 1-2 in a multiblock robot service vehicle 1-14 is coupling to the E-POOL distribution group 1-8, in order to take over materials for the road and street services. The drive units are composed of multiblock belt drive units 9'-29. All basic unit assembly groups have continuously data exchange by means of the under floor current and communication supply lines 3-11, the antenna units 9'-3, the E-POOL satellite units 9'-32, and with the E-POOL central computer units 3-17. The multiblock transport robot 1-1 in accordance with FIG. 13, is transporting the stationary refrigerator and distribution box 1-12 within a house floor. The house floor has position and direction code train guide-ways 3-5 on the ground and also under the ceiling. For the contact protected train guidance and the position and direction code train control, the multiblock transport robot 1-1 receives pivoting-arms sensors 9'-20 at both ankles and additionally in the range of the ceiling at the robot solar unit, which is combined with the there centrally provided image recognition unit 9'-22 and the antenna unit 9'-3. Furthermore is this multiblock transport robot 1-1 equiped with hydraulic socket flange booster chambers 9'-31 which are pluged on the rotation flange plug connections 2-2 of the multiblock robot standard parts 2-1. The hydraulic socket flange booster chambers 9'-31 contain hydraulics pumps and hydraulics fluids 3-23, which through a separated multi fluid channel 3-2, sheathing the current and communication channels 3-1, 3'-1 of the multiblock standard parts 2-1 with its current conducters 3-22 and the communication conductors 3-21, and leads hydraulic fluid 3-23 to hydraulic valves of the gear units 9'-7 and of the gripper units and increases the torque of the rotation flange plug connections 2-2, for the purpose of a higher load holding capacity. The multi fluid channels 3-2 have additional control chambers 3'-2 For the control and return flow of the hydraulic fluids 3-23.

In accordance with FIG. 14, the mobile E-POOL production and composition group arrangement 1-8 is taking over mobile refrigerator and distribution boxes 1-13, which are driving on multiblock wheel drive units 9'-9. The mobile production and composition group arrangement 18 is equally equiped with wheel drive units 9'-9. All chassis units have the under floor current and communication pivoting arms 3-13 pivoted out, so that, with its current and communication commutator carriage 3-4, they have access to the contact protected under floor current and communication supply lines 3-11, and they have orientation guides for positioning by means of the position and direction code train guide-ways 3-5, on the lane surface. All mobile E-POOL production and composition group arrangements 1-8 are equiped with pivoting segment solar units 9'-26, surrounding the mobile E-POOL production and composition group arrangements 1-8, under an inclination angle, for optimization of the energy yield by means of a far-reaching vertical positioning to the sun irradiation. The pivoting segment solar units 9'-26, are pivoted and adapted in horizontal direction in accordance with the direction of the sun beams, independently of the respective position of the production and composition group arrangements 1-8. This optimization being self operating similarly as for the pivoting inside compartments 9'-28 of the FIGS. 4, 5, 6, by means of the multiblock standard parts 2-1, annular chassis tracks 9'-38 and annular roller supported step bearings 9'-39, which however, are here provided in roof position. For the inside room of the mobile production and distribution group arrangements 1-8, is a service robot 1-3 provided, which composes the orders, with access to the concentric, pivotable annular body 1-16 and load access to the access passage 1-20 and to the there made available, mobile refrigerator and distribution box 1-13. The mobile refrigerator and distribution boxes 1-13, which have been completely processed by and within the mobile production and distribution group arrangements 1-8, are put in line one behind or beside of the other on refrigerator availability grounds, centered on entrance-exit pivoting units 3-15 of the contact protected under floor current and communication supply lines 3-11, pivoting immediatly the under floor current and communication pivoting arms 1-13 with its current and communication commutator carriages 3-4 into the under floor current and communication supply lines 3-11. The mobile refrigerator and distribution boxes 1-13 have at the bottom section air condition socket flange booster chambers 9'-41. These using in the same way like the hydraulic socket flange booster chambers 9'-31 of the FIG. 13, the central multi fluid channels 3-2 with the additional control chambers 3'-2 of the multiblock standard parts 2-1, and distributing within the inside room of the mobile refrigerator and distribution boxes 1-13, cooling fluid e.g. for cooling of food, and so keeping it at refrigerator temperature. The mobile refrigerator and distribution boxes 1-13, are driven on the own wheel drive units 9'-9 and are guided by means of the position and direction code train guide-ways 3-5, to the individual ordered points and destinations.

Figure 15:
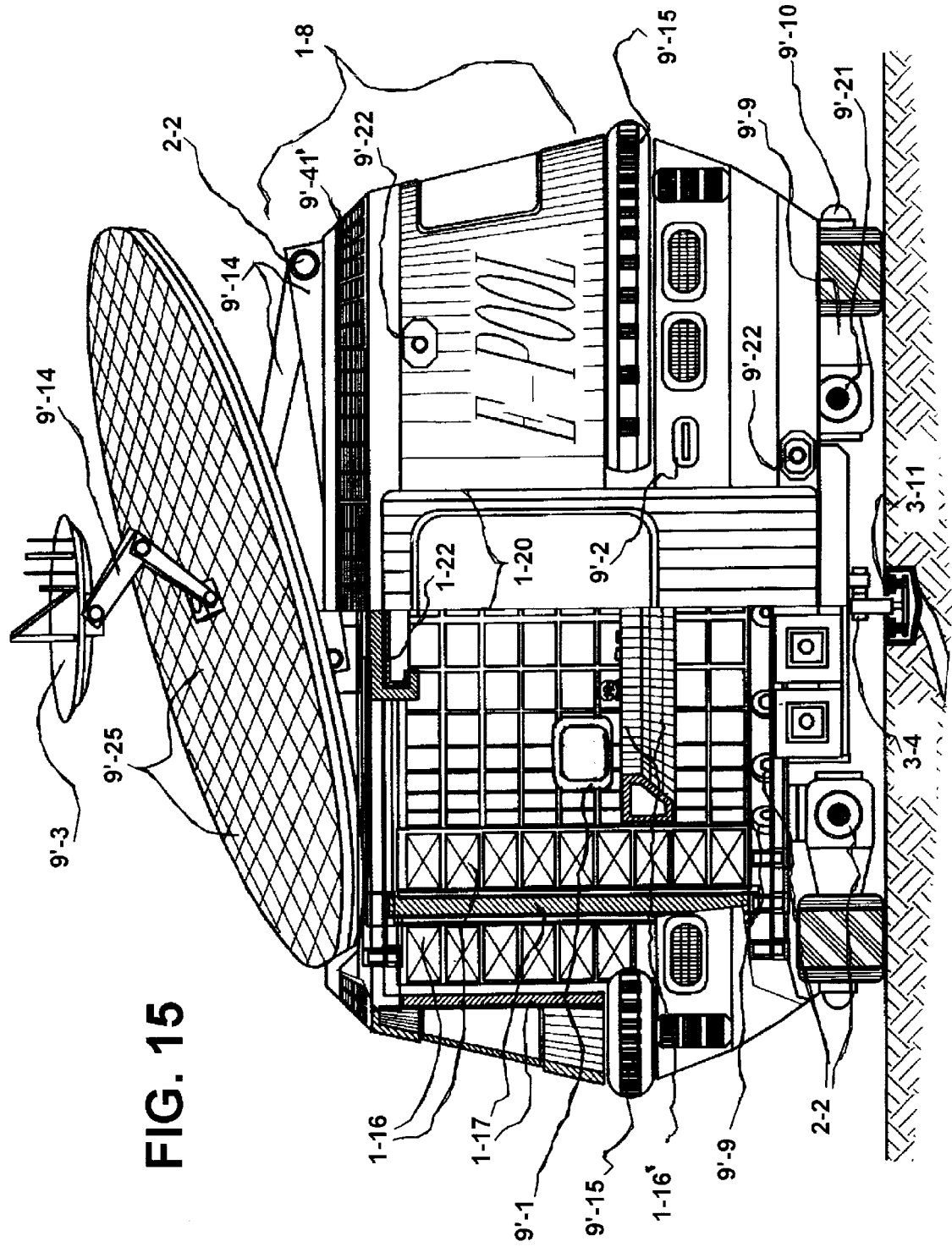
FIG. 15, is the semi-sectional front view of a large scale distribution group arrangement with pivoted current and communication carriage within a contact protected under floor current and communication supply line.
Figure 16:
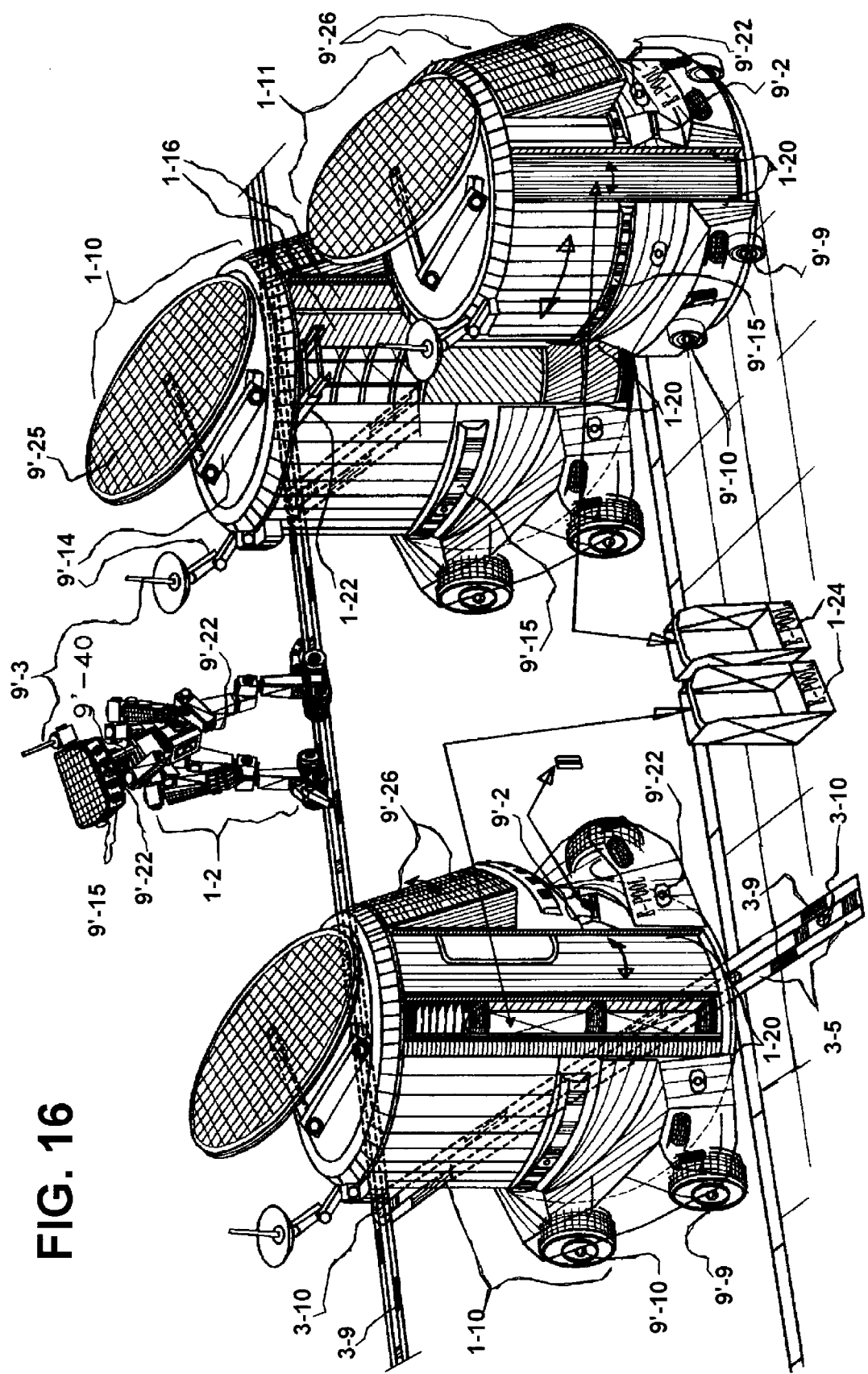
FIG. 16, is the perspective view of two train guide way leaded E-POOL delivery-distribution assembly group arrangements and a direct withdrawal-distribution group arrangement, as also a train guide way leaded multiblock road and street operation robot.
Figure 17:
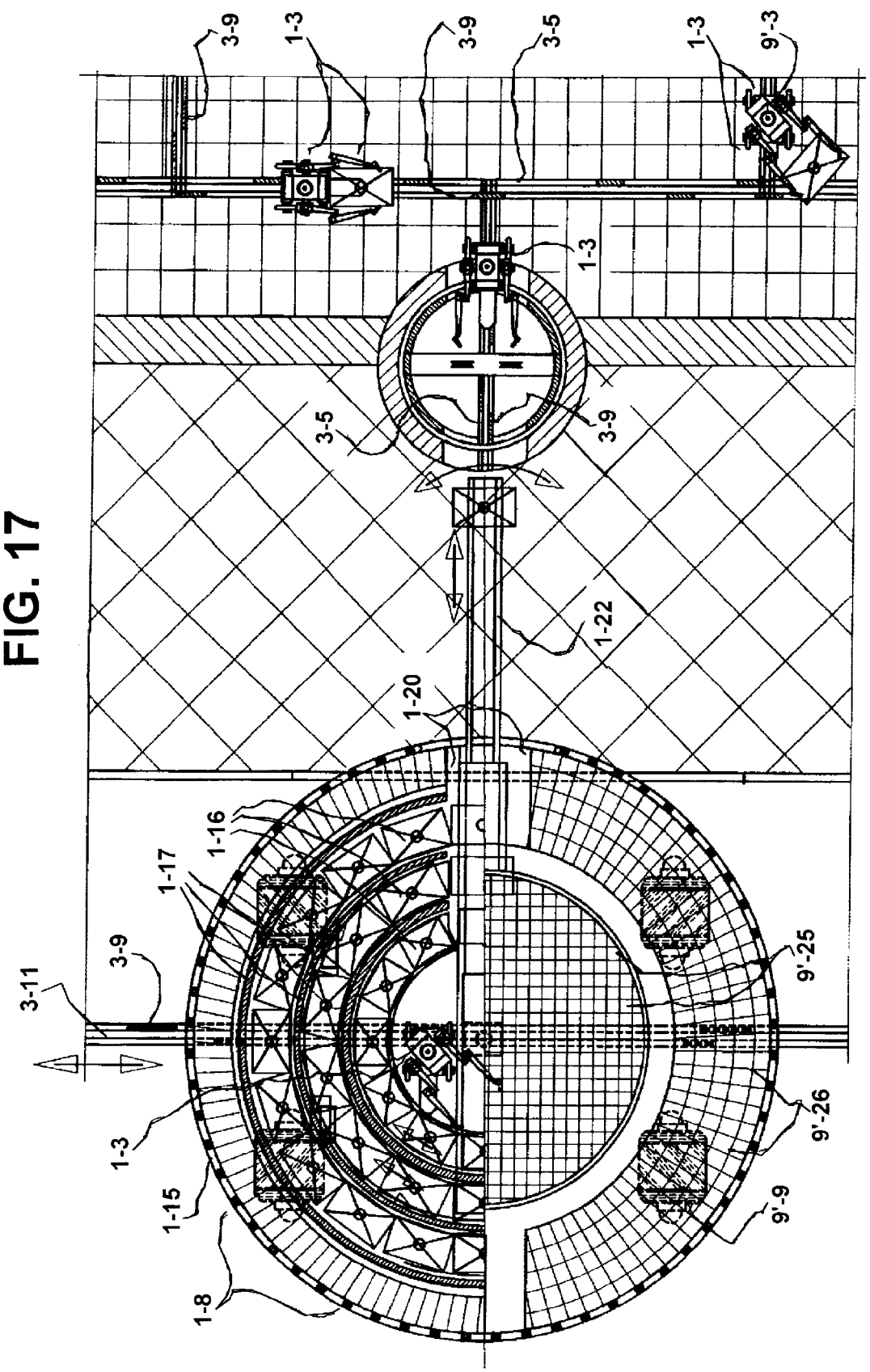
FIG. 17, is the semi-sectional plain view of a train guide way leaded production and composition group arrangement, carrying out a freight unload by means of a telescop carrier, as also a sectional view of a house entrance with elevator, and floor load transport by means of an E-POOL multiblock house service robot.
Figure 18:
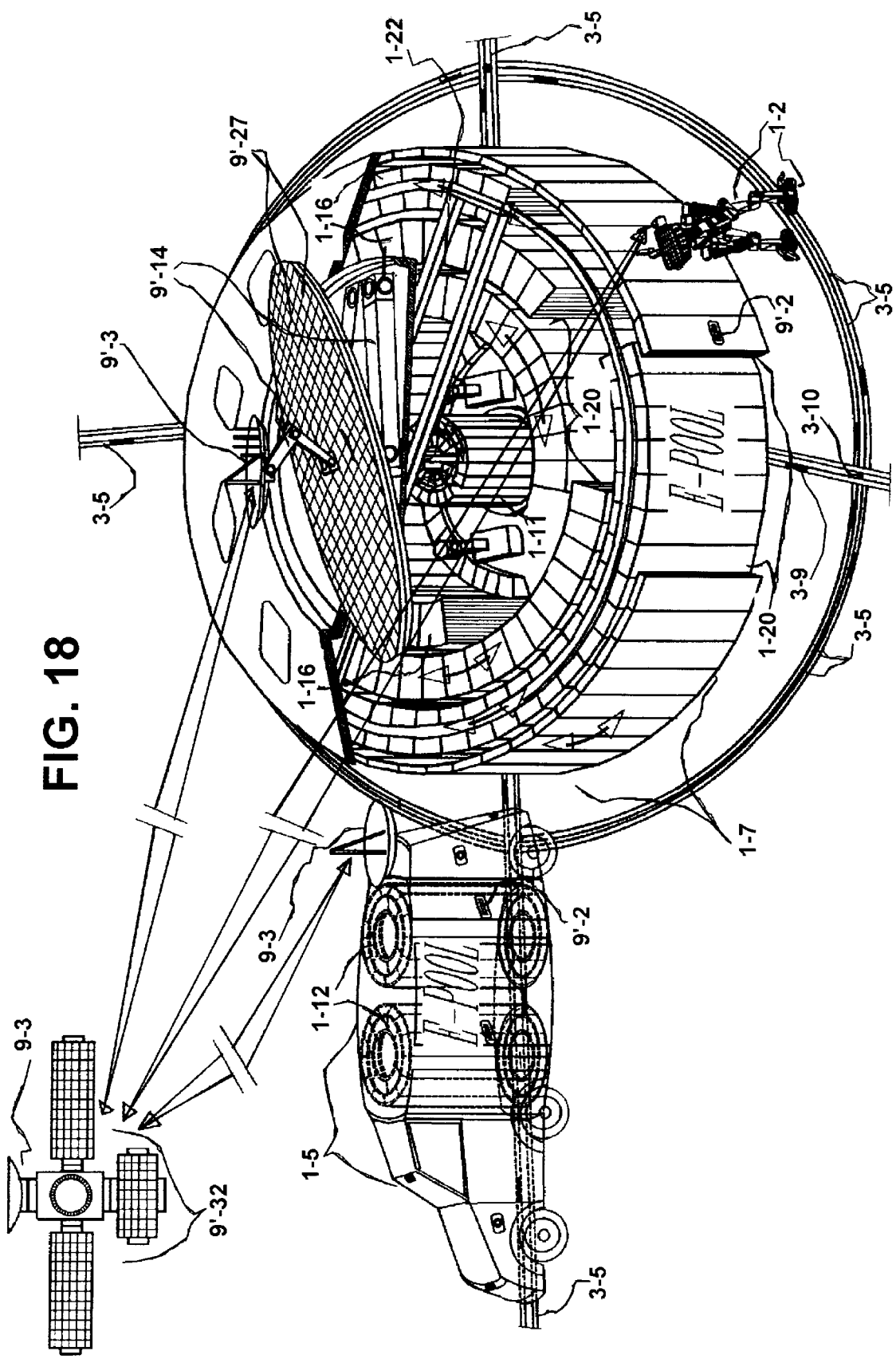
FIG. 18, is the perspective view of a stationary E-POOL production and composition group arrangement, for the production and delivery of goods, with the clearance of an E-POOL transport vehicle, as also of an E-POOL multiblock security robot on a circular train guide way around the systems cell unit, and the data exchange with E-POOL satellite units.
Figure 19:
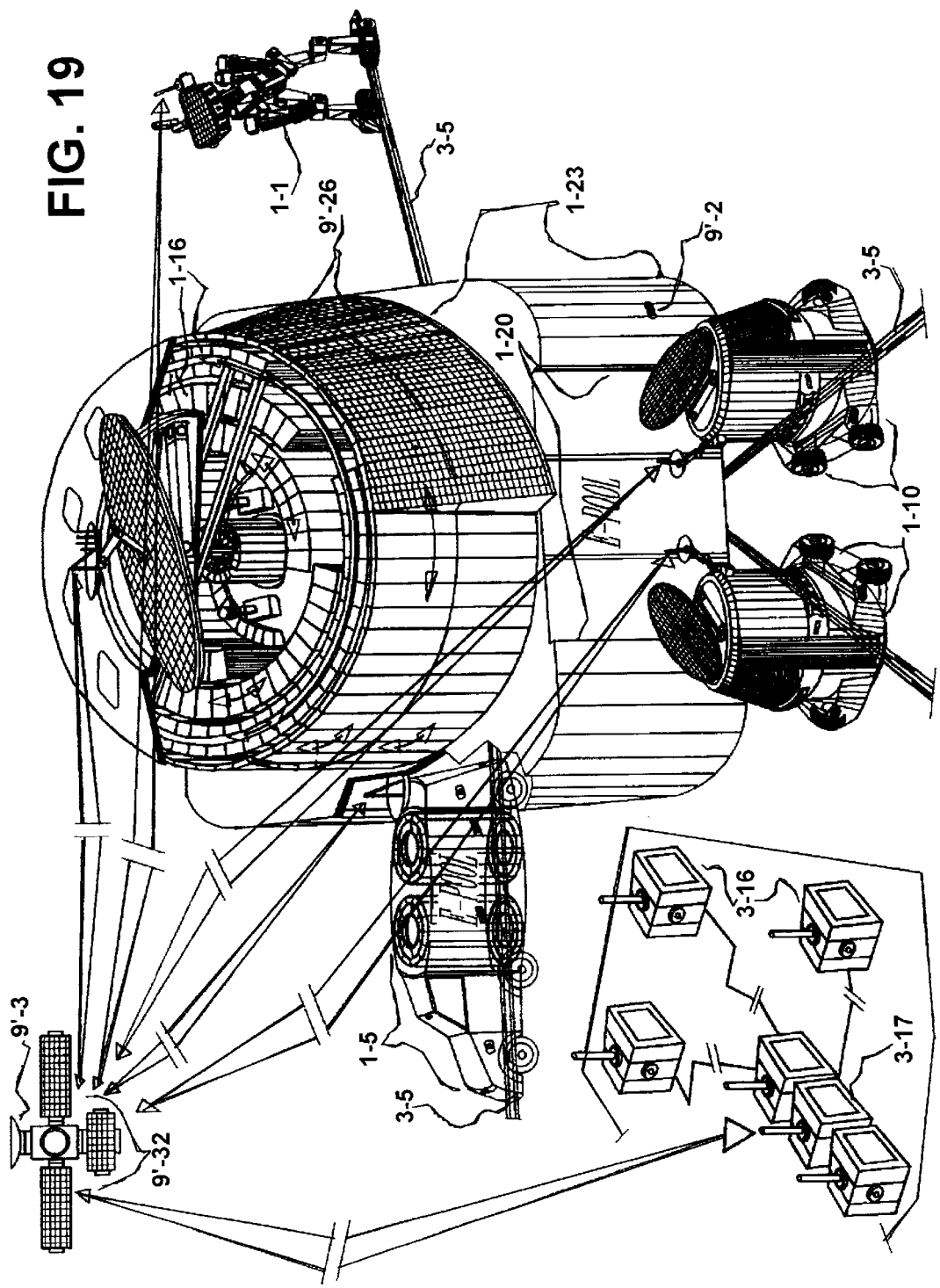
FIG. 19, is the perspective view of a stationary double floor E-POOL production and composition group arrangement for the production and delivery of goods, with the clearance of an E-POOL transport vehicle, the arrival of mobile production and composition group arrangements and of a multiblock transport robot, as also the data exchange with E-POOL central computers by means of the E-POOL satellite units.
Figure 20:
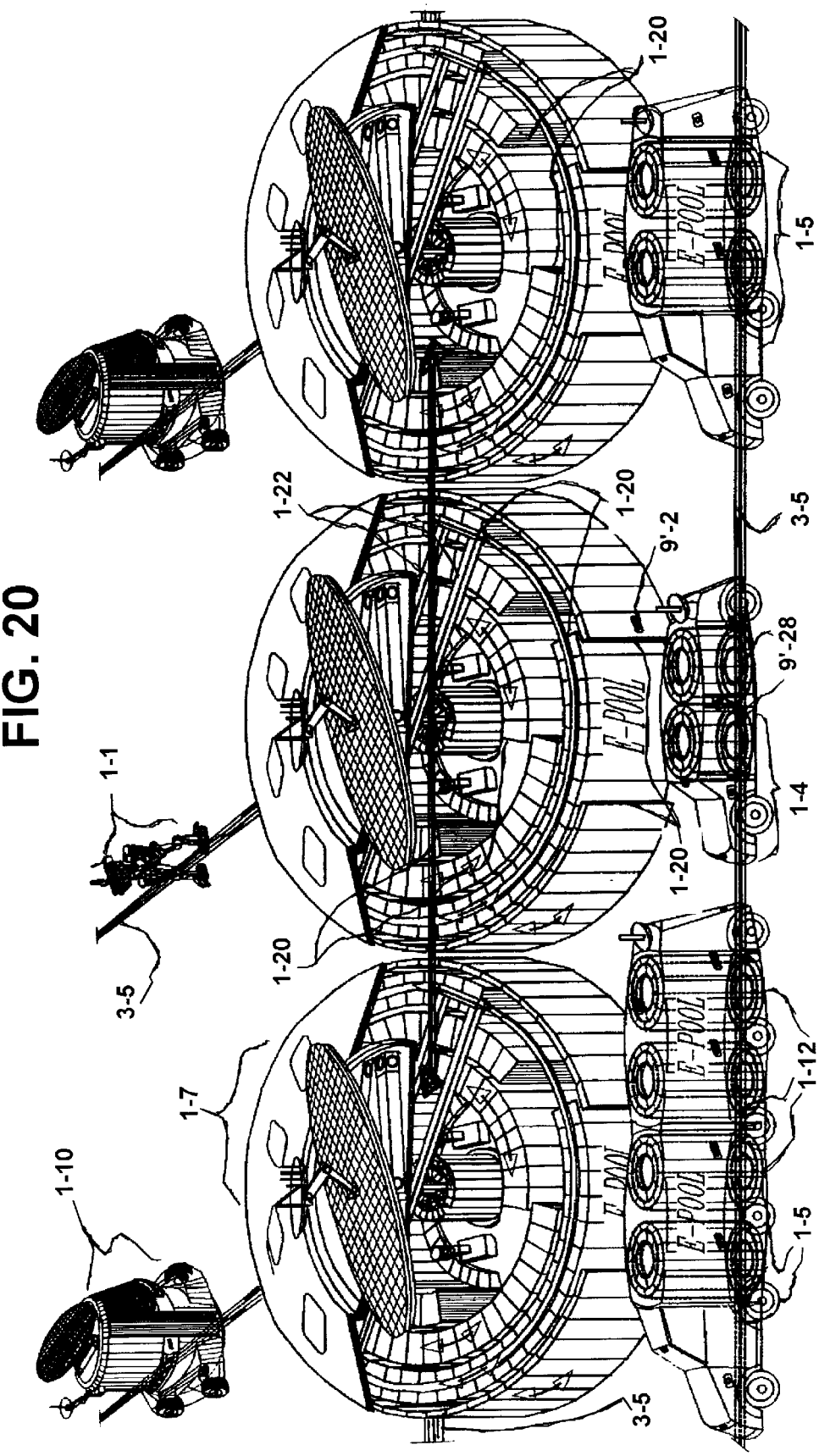
FIG. 20, is the perspective view of a stationary serial E-POOL production and composition group arrangement, composed of three stationary production and composition group arrangements in accordance with the FIG. 18, for the production and composition of goods, with connection to train guide way leaded E-POOL transport group arrangements and the arrival of small distribution group arrangements and of a multiblock transport robot.

In accordance with FIGS. 15 to 20, all production and composition group arrangements 1-8, included the refrigerator and distribution boxes 1-12, 1-13 have a structure and mode of function in accordance with FIG. 15, however in correspondance with the use and size, equiped with different multiblock standard parts 2-1 and socket flange booster chambers 9, 9'. The concentric, pivotable annular bodies 1-16, as like as the sealed rings 1-17 are driving on multiblock wheel drive units 9'-9 on the concentrical circular tracks, and they are guided similarly as the pivoting inside compartments 9'-28 of the FIG. 4 to 6, on annular chassis tracks 9'-38. The concentric, pivotable annular bodies 1-16 are equiped with air condition socket flange booster chambers 9'-41 and have optionally food, materials, goods, tools and most different devices. Within the pivoting inside compartments 9'-28, on the pivotable annular body 1-16 are inserted board computers 9'-1 as also pluged work and composition brackets 1-16'. The sealed rings 1-17 are sealing the concentric, pivotable annular bodies 1-16 against each other, so that the most different components, materials, semi-finished products and stocks can be keeped closely beside to each other, volume optimized and through the concentric displacement technique, speed optimized manufactured, produced, processed and composed. The entire outside upper part is separately pivotable arround the center and it has, as like as the bottom part, an access passage 1-20. Also each of the the pivotable annular bodies 1-16 is provided with an access passage 1-20, respectively an access opening. The passage and access to the separate pivotable annular bodies 1-16, from the inside and the outside is possible, if the access passages 1-20 and access openings are pivoted in, constituting a lined up continuous passage. The concentric pivotable annular body 1-16, supports the multiblock drive units 9'-9 with the telescopic carrier 1-22 for its concentrical rotation in the inside room. The telescopic carrier 1-22 is provided for the take over of loads, multiblock robots 1-1, 1-2, 1-3, stationary refrigerator and distribution boxes 1-12, for the transfer on the telescopic carrier 1-22 from the outside to the inside and vice versa, as also for the material movements and work assistance of the multiblock robots 1-1, 1-2, 1-3 in the inside room. The multiblock robots 1-1, 1-2, 1-3 are equiped with lateral rotation flange plug connections 2-2 having roller units of the size in correspondence to the size of the telescopic runway. This trolley like equipments, provided at the robot solar unit, in accordance with the FIG. 12b, are serving as robot overhead drive units, so that the robots are freely moveable and overhead transfered, suspending in the telescopic carrier 1-22. All distribution, production and composition group arrangements 1-7, 1-8, 1-10, 1-11, 1-23, are equiped with circular roof solar units 9-25 which are pivoted and horizontally and vertically adapted to the respective level and direction of the sun irradiation, by means of the multiblock robot pivoting arms 9'-14. These circular solar units 9'-25 being installed in addition to the pivotable segment solar units 9'-26, provided at the outside circumference. The integrated antenna unit 9'-3 being pivotable individually and independently from the circular roof solar unit 9'-25, for the optimal data exchange with E-POOL satellite units 9'-32, by means of the multiblock robot pivotable arm 9'-14. At the roof section are furthermore provided, air condition exhaust slots 9'-41'. The drive security equipments, drive units, current access, signal control and sensoric operations, as like as the general operation, access and passage equipments, are otherwise totally identical to the corresponding equipment of the E-POOL transport group arrangements. The mobile production and composition group arrangements 1-8 being the largest distribution group arrangements, as such taking over materials and goods for the own production and composition, for the delivery to stationary and mobile refrigerator and distribution boxes 1-12, 1-13 and for the composition of goods and the transfer to delivery-distribution group arrangements 1-10, in accordance with the FIG. 16. The delivery-distribution group arrangements 1-10, are commuter-distribution group arrangements for the direct goods take over from the stationary production and composition group arrangements 1-7 and 1-23, in accordance with the FIGS. 18 to 20, or from the mobile production and composition group arrangements 1-8, for the internal processing, subsequent treatment and transfer by means of the multiblock transport robots 1-1 to the direct withdrawal-distribution group arrangements 1-11 which, being the smallest distribution group arrangements, are driving up to the house entrances of the orderers or are delivering to optional E-POOL transport and distribution group arrangements. The concentric pivotable annular body 1-16 of the mobile production and composition group arrangements 1-10 and of the direct withdrawal-distribution group arrangements 1-11, are provided with purchase containers 1-24, shelf containers and partitions. The purchase containers 1-24 and other goods and ordered objects being delivered by means of the multiblock transport robots 1-1, up to the house entrance and from there, by means of house service robots 1-3, they are transfered up to private apartements, working rooms, labs, hospitals, into the rooms for reception of the orderers. For the direct withdrawal of goods and ordered objects from the different distribution group arrangements and from the mobile and stationary refrigerator and distribution boxes 1-12, 1-13, the E-POOL user checkcards are put into the outside reader slots 9'-2. Than the concentric pivotable annular bodies 1-16 are pivoted to the direction of the access openings 1-20. The reserved access sector of the orderer opens and the E-POOL user has access to his order, to his purchase container 1-24 and his ordered goods within the shelf partitions. The mobile production and composition group arrangement 1-8, in accordance with the FIG. 17, tranfers larger good units by means of the telescopic carrier 1-22, for the direct house delivery and leads the goods to the house elevator. From there, the goods are transfered to the floors and to the apartements, to offices and other ordered positions, by means of position and direction code train guide-way 3-5 guided multiblock house service robots 1-3. The stationary production and composition group arrangements 1-7 in accordance with the FIG. 18, comprise three concentric pivotable annular bodies 1-16. Within the inside room are installed production and composition machines. A direct withdrawal distribution group arrangement 1-11 is being driven into the inside room, through the access openings 1-20, for the take over operation of goods. By means of position and direction code train guide-ways 3-5, which lead from the outside roads and streets to the inside room, the self operating drive and access is ensured from north, south, west and east directions for transport operations of transport and distribution group arrangements, directly into and from the inside rooms. For the entry operations, the access openings 1-20 of the concentric annular bodies 1-16 of the sealed rings 1-17, in accordance with FIG. 15, and the pivotable outside wall, is being pivoted up to the center line of the respective position and direction code train guide-ways 3-5. The shown heavy load transporter 1-5 with installed stationary refrigerator and distribution boxes 1-12 has taken over, new ordered goods from within the stationary production and composition group arrangement 1-7, and train guided it is leaving the installation. An additional position and direction code train guide-way 3-5, arround the stationary production and composition group arrangement 1-7 is provided, for the train guidance of a multiblock street operation robot 1-2, which supervises the position and direction code train guide-ways 3-5 from and to the stationary production and composition group arrangement 1-7, services and deans all of the position and direction code train guide-ways 3-5 and which moreover, on the circular position and direction code train guide-way 3-5, safeguards the outside sectors against unauthorized access and entry. The double floor stationary production and composition group arrangement 1-23, in accordance with the FIG. 19, has in its ground floor a separate availability room for transport vehicles and distribution group arrangements, and in its upper floor a production and composition group arrangement 1-7. For the entry and departure, the loading and delivery of the E-POOL transport group arrangements, from and to E-POOL individual cars 14, to rail-road-street transporters 1-6 and to all distribution group arrangements, is also provided a dual track train-guide of position and direction code train guide-ways 3-5 in front of the building. All self operating process chains of the E-POOL traffic, transport and distribution group arrangements and of the composition group arrangements 1-23, released from the individual E-POOL computers 3-16 and from to these compatible computer units, are carried through in a continuous data exchange and compound over the electronic E-POOL network, with its E-POOL central computers 3-17, the E-POOL satellite units 9'-32, the antenna units 9-3, the sensor socket flange booster chambers, the sensor outside rings 9'-15, the board computers 9-1, as like as over the information conducters within the under and upper floor current and communication supply lines 3-11, 3-12. The three production and composition group arrangements 1-7, which in accordance with FIG. 20, are arranged in a serial combination, traversed by the centrally leaded position and direction code train guide-ways 3-5 and permitting the train guided passage through the entire serial combination. For the traversing drive through the serial combination, all access passages and access openings 1-20 are pivoted to the center line of the position and direction code train guide-ways 3-5. Consequently, an unhindered total traversing from one production and composition group arrangement 1-7 to the other is ensured. The transport group arrangements in front position to tie serial combination, on the position and direction code train guide-ways 3-5, being loaded by means of the telescopic carriers 1-22, without the need to enter the serial combination. The position and direction code train guide-ways 3-5 at the opposite side however, are leading the delivery and distribution group arrangements 1-10 and the multiblock transport robot 1-1, directly into the inside room of the production and composition arrangement groups 1-10, for the self operating take over of goods and for corresponding transport operations.

I claim:

1. A Multiblock robot prodcution and distribution network comprising:

Electric and electronic E-POOL networks, consisting of multiblock E-POOL individual computer units, central computers, board computers, satellite units, antenna units, open and contact protected road and street under floor and upper floor current and communication supply lines with internal control point identification marks, position and direction code train guide-ways composed of thin-coat varnish and thin layer metalised adhesive foils with integrated induction conductors, deposited on the road and street surfaces and identical to the road and street surfaces deposition, upper side and inside of said open and contact protected road and street under floor and upper floor current and communication supply lines, wherein:

said electric and electronic E-POOL networks are far-reaching energy independent, having continous data exchange to all E-POOL network members by means of multiblock robot standard parts with internal current and communication lines, in interconnection with roof solar units, segment solar units, solar and wind power installations, with battery supplying and battery recharge E-STOPS, composing a self operating E-POOL compound, said electric and electronic E-POOL networks are integrating multiblock transport robots, street operation robots, service robots, multiblock robot service vehicles, traffic and transport group arrangements, composed of individual cars and vans, heavy load transporters, busses, rail-road-street transporters, distribution group arrangements with mobile production and composition group arrangements, delivery and direct withdrawal group arrangements, mobile and stationary refrigerator and distribution boxes, as also stationary production and composition group arrangements; and said electric and electronic E-POOL networks composed for E-POOL users, are equiped with said E-POOL individual computer units, having compatible E-POOL order software, transmitting orders and instructions to said E-POOL central computers for deliveries and services, which are immediatly, self operating produced from said E-POOL compound, composed, distributed and transported to an aimed destination and precise position of a company ground, an institutional building, a house entrance, to an apartment entrance, and to any other predetermined destination.

2. A Multiblock robot prodcution and distribution network as claimed in claim 1 wherein:

said contact protected under floor current and communication supply lines of said E-POOL networks are provided with water discharge slots, positioned in distances to each other, for the discharge of rain water, to water discharge channels, leaded directly below said under floor current and communication supply lines, said water discharge channels having sewage pumps in greater distances to each other and discharging the sewage water into the public canalisation;

said contact protected under floor current and communication supply lines of said E-POOL networks are provided with E-STOP multiblock solar and wind power stations, installed in center line position to the drive directions, but also laterally at street sides for the far-reaching autonomous current supply of said contact protected under floor and upper floor current and communication supply lines;

said multiblock solar and wind power stations of said E-POOL networks, being directly connected with said contact protected under floor current and communication supply lines, by means of socket flange booster chambers.

3. A Multiblock robot prodcution and distribution network as claimed in claim 1 wherein:

said, E-POOL traffic, transport, distribution and composition group arrangements are provided with socket flange booster chambers for multiblock robot speech reproduction control units, with E-POOL checkcard reader units with programmed control code and coded entry and access justification;

said multiblock standard parts and said socket flange booster chambers are pluged together to multi-axis multiblock under floor and upper floor current and communication pivoting arms, having contactless sensor units for train guidance, positioning and position control, by scanning said position and direction code train guide-ways;

said contact protected under floor and upper floor current and communication supply lines are provided with entrance-exit pivoting units for pivoting in and pivoting out of communication commutator carriages, without drive slow down.

4. A Multiblock robot prodcution and distribution network as claimed in claim 1 wherein:

said E-POOL traffic, transport, distribution and composition group arrangements are equiped with sensor outside rings, having sonar and infrared sensors for locating of nearby objects and persons;

said E-POOL traffic, transport, distribution and composition group arrangements receive freely, at 360° pivoting, inside compartments, instead of the usually used doors, having an automobile body cover structures with side-window insertion and lateral and back sided access openings, and being supported by annular chassis tracks, provided precisely in center line of said E-POOL traffic, transport, distribution and composition group arrangements, said inside compartments are provided with slide-in, slide-out units for take over, deposition and transport of multiblock robots, of persons, goods, devices and materials;

said inside compartments are pivoted, so that the lateral and back sided access openings are becoming free for entry of persons and for loading of goods and objects, and having longitudinal roller sealing rubbers, closing tightly said automobile body cover structure, during swing-in states, ready for drive;

said inside compartments have to the left and to the right, beside of seats, manually commanded control units which comprise steering control units, for manual steering take over of users at every time, thus disconnecting entirely or partially self operating functions;

said manually commanded control units of said inside compartments having moreover keyboards and multiblock robot speech reproduction units for operational dialog with said board computers, furthermore checkcard reader units, additionally to outer contour checkcard reader units which are pluged in, for first verification of user justifications, thus for a dual verification of justifications to use said E-POOL network, releasing a control signal for switching to a free use all functions;

said inside compartments are pivoted by one of said multiblock standard parts which is centrally pluged, for enabling free access, unhindered entry and load take over, by pivoting said inside compartments to the left or to the right, after the release of control signals;

said inside compartments ae provided with palettes, load containers, load forks, load elevating devices, containers, conveyor belts, two or more seats for persons, for the take over transfer, the deposition and transport of objects, loads, materials, devices, robots and persons.

5. A Multiblock robot prodcution and distribution network as claimed in claim 1 wherein:

said E-POOL traffic, transport, distribution and composition group arrangements are serviced and prepared for readiness in availability subways, provided laterally to the roads and streets, said availability subways also provided for maintenance, cleaning and battery exchange and recharge operations, provided for these operations with said contact protected under floor current and communication supply lines and with installations of said E-STOPS;

said availability subways are provided with entrance and exit openings, horizontally closed by roller doors which are driven by said multiblock drive units;

said multiblock road and street operation robots are driving on own belt drive or wheel drive units, being provided for service and maintenance within said availabiltiy subways, for outside supervisions of said E-POOL network and for cleanding of lanes, tracks, and inside compartments, for removing of drive obstacles, for repair and new installations of said contact protected under and upper floor current and communication supply lines and of said position and direction code train guide-ways;

said multiblock road and street operation robots are driving within especially for road and street works provided multiblock robot service vehicles, said multiblock robot service vehicles coupled to provided mobile position and direction code train guide way laying-containers, containing varnish material for said varnished metalised thin-coats and containing said thin layer metalised adhesive foils, composed of roll materials;

said multiblock road and street operation robots with said multiblock robot service vehicles and said road and street machines, mark and lay down in speedy operation cycles of road and street color marking and rolling material laying machines, said position and direction code train guide-ways, precisely and in exact positions on the roads and streets, with optional directions, curves and ascents, precisely positioned and controlled by driving ahead road and street operation robots.

6. A Multiblock robot prodcution and distribution network as claimed in claim 1 wherein:

said multiblock transport robots have for the orientation during transport operations and for delivery in rooms and multiple floor buildings, at the ground and under the ceilings, there provided position and direction code train guide ways for contactless train guides;

said multiblock transport robots are provided for said contactless train guide in rooms and multiple floor buildings, are equiped with pivoting-arms sensors at both ankles and additionally in the range of ceilings at there pluged robot solar units, which are combined with centrally provided image recognition units and with said antenna units;

said multiblock transport robots, provided for the transport of heavy loads and of said stationary refrigerator and distribution boxes, are equiped with hydraulic socket flange booster chambers which are pluged on rotation flange plug connections of said multiblock robot standard parts, containing hydraulics pumps and hydraulics fluids, which through separately provided multi fluid channels, sheathing said current and communication channels of said multiblock standard parts with its current and communication conductors, lead said hydraulic fluid to hydraulic valves of said multiblock transport robots gear units and gripper units, thus for torque increasing of said rotation flange plug connections, and additionally to said multi fluid channels are provided control channels for said hydraulic fluids control and return flow.

7. A Multiblock robot prodcution and distribution network as claimed in claim 1 wherein:

said rail-road-street transporters and busses are driving on rails and likewise on roads and streets and are self operating leaving the rails for running on streets and vice versa, in full speed;

said rail-road-street transporters and busses are provided with rail-road-street wheel units, arranged in direction of the axis, beside the road and street wheels and also arranged separately, one behind the other, and in accordance with the use, rail or road and street, respective needed wheels, being pivoted to the upper or lower position by means of said multiblock standard parts, in the same way as for the current and communication pivoting arms, so that, if getting contact with the roads and streets, said rail wheels being pivoted to the upper position, and In the case of rail ride, said rail wheels have contact with the rails and said road and street wheels being pivoted to the upper position;

said rail-road-street transporters and busses having said train guides for fully self operating ways rail rides centrally to the rail tracks, where said position and direction code train guide-ways and said internal control point identification marks are deposited on available sleepers of the rail body, and there being contactless scanned from said multiblock standard part sensors of said under floor and upper floor current and communication pivoting arms;

said rail-road-street transporters and busses, being equiped with roof current and communication pivoting arms for current and communication connection with open overhead current and communication supply lines;

said rail-road-street transporters and busses, having for transition from the rail to the road and street, and likewise from the road and street to the rail, entrance-exit pivoting units and there provided ascent slopes to the road and street lanes;

said roof current and communication pivoting arms for current and communication connection with said open overhead current and communication supply lines, are pivoted from said open overhead current and communication supply lines, during transition from the rail to the road, and simultaneously, the under floor current and communication pivoting arms are pivoted into the contact protected under floor current and communication supply lines;

said roof current and communication pivoting arms for enabling the current and communication supply, using also current and communication supply lines which are provided laterally to the drive direction, in correspondence with the respective, existing track equipment.

8. A Multiblock robot prodcution and distribution network as claimed in claim 1 wherein:

said distribution group arrangements with said mobile production and composition group arrangements and said delivery and direct withdrawal group arrangements, said mobile and stationary refrigerator and distribution boxes, as also said stationary production and composition group arrangements are provided with concentric, pivotable annular bodies for materials, devices and goods, having access passages and access openings;

said concentric, pivotable annular bodies are equiped with said multiblock drive units which on its circular tracks, are guided on said position and direction code train guide ways and having power supply by means of said contact protected under floor current and communication supply lines;

said concentric, pivotable annular bodies are supporting on its outer annular body, pivotable telescopic carriers pivoted by said multiblock drive units, for a transfer of said multiblock robots, as also of materials and goods, from outside to inside and vice versa;

said multiblock robots having a robot solar unit in head position which is provided with lateral rotation flange plug connections, having roller units in correspondence to telescopic runway dimensions and by means of this trolley like equipment, serving as robot overhead drive units, so that said robots are freely moveable and overhead transfered, suspending in said telescopic carriers for floor free inside and outside works;

said telescopic carriers having moreover said rotation flange plug connections, congruent to said rotation flange connections in head position of said stationary refrigerator and distribution boxes, for the self operating take over and deposition in said inside room or vice versa to the outside, taking over from, or for deposition on, said congruent rotation flange plug connections, provided on the ground;

said multiblock robots being additionally inserted on said position and direction code train guide ways, ground floor guided within said inside rooms, and driving from the inside room to the outside and vice versa;

said stationary refrigerator and distribution boxes, as also said mobile and stationary production and composition group arrangements are equiped with air condition socket flange booster chambers, using in the same way like hydraulic socket flange booster chambers, said central multi fluid channels with the additional control chambers of said multiblock standard parts, and distributing within said inside rooms, cooling fluid for cooling of food and air condition, and for thus having for the air exchange, air condition exhaust slots;

said concentric, pivotable annular bodies of said mobile and stationary production and composition group arrangements and said delivery and direct withdrawal group arrangements, are equiped with purchase containers, shelf containers and partitions;

said purchase containers and other goods and ordered materials and devices, are delivered from said multiblock transport robots to house entrances and from there, by means of said house service robots, they are transfered up to private apartments, working rooms, labs, offices, hospitals, into the rooms, for reception of the orderers;

said group arrangements giving free acces for users to the enclosed goods and materials inside of said group arrangements, if an E-POOL user puts an E-POOL user checkcard into reader slots, provided at the outer contour of said group arrangements, releasing a control signal, and said concentric pivotable annular bodies are pivoted to the direction of said access openings and the reserved access sector, determined for the respective orderer, opens, thus that the E-POOL user has access to his order, to said purchase container and his ordered goods within corresponding shelf partitions.

9. A Multiblock robot prodcution and distribution network as claimed in claim 1 wherein:

said E-POOL satellites are composed of said multiblock standard parts, pluged together with socket flange boster chambers, having said antenna units and said pivotable multiblock solar units;

said mobile E-POOL group arrangements are provided with roof solar units which in stand position are pivoted, and adjusted for the optimal energy use, horizontally and vertically continuously adapted with its solar surfaces, corresponding to the respective level and always vertical direction of the sun irradiation, by means of said multiblock robot pivoting arms, and which are self operating repivoted into the original position, in the same level with the roofs, if the mobile group arrangements are restarting for driving;

said E-POOL distribution and production group arrangements are provided with circular roof solar units with said multiblock robot pivoting arms, having integrated said antenna units with said multiblock robot pivoting arms for its own self operating, individual pivotation and optimal signal reception, separated from said multiblock robot pivoting arms for said circular roof solar units;

said E-POOL distribution and production group arrangements having moreover outside peripheral said segment solar units, horizontally pivotable and installed with an inclination to the sun direction.

* * * * *